US012466332B2

(12) United States Patent
Yu et al.

(10) Patent No.: US 12,466,332 B2
(45) Date of Patent: Nov. 11, 2025

(54) DISPLAY APPARATUS FOR VEHICLE

(71) Applicant: LG ELECTRONICS INC., Seoul (KR)

(72) Inventors: Ganghee Yu, Seoul (KR); Hyoungkyu Choi, Seoul (KR); Sangwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 18/035,460

(22) PCT Filed: Nov. 4, 2021

(86) PCT No.: PCT/KR2021/015840
§ 371 (c)(1),
(2) Date: May 4, 2023

(87) PCT Pub. No.: WO2022/098103
PCT Pub. Date: May 12, 2022

(65) Prior Publication Data
US 2023/0406224 A1    Dec. 21, 2023

(30) Foreign Application Priority Data
Nov. 4, 2020    (KR) .................. 10-2020-0146349

(51) Int. Cl.
*B60R 11/02*    (2006.01)
*B60R 11/00*    (2006.01)

(52) U.S. Cl.
CPC ...... *B60R 11/0229* (2013.01); *B60R 11/0264* (2013.01); *B60R 2011/0003* (2013.01);
(Continued)

(58) Field of Classification Search
CPC ........ B60K 2360/182; B60K 2360/583; B60K 35/00; B60K 35/29; G06F 2009/45579;
(Continued)

(56) References Cited

U.S. PATENT DOCUMENTS

| 6,085,203 A | 7/2000 | Ahlers et al. |
| 2007/0143798 A1 | 6/2007 | Jira et al. |

(Continued)

FOREIGN PATENT DOCUMENTS

| CN | 111240631 | 6/2020 |
| DE | 102014221247 | 4/2016 |

(Continued)

OTHER PUBLICATIONS

PCT International Application No. PCT/KR2021/015840, International Search Report dated Feb. 2022, 6 pages.
(Continued)

*Primary Examiner* — Charles J Han
(74) *Attorney, Agent, or Firm* — LEE, HONG, DEGERMAN, KANG & WAIMEY

(57) ABSTRACT

A display apparatus for a vehicle is disclosed. The display apparatus includes a first display and a second display located in a vehicle; a signal processing device including a processor configured to perform signal processing for the first display and the second display; a third display located in the vehicle; and a second signal processing device including a second processor configured to perform signal processing for a third display, wherein, in case in which data is transmitted from the signal processing device to the second signal processing device, a data transmission method is changed based on the type of data. Consequently, transmission efficiency may increase in case in which data is transmitted between a plurality of signal processing devices in a vehicle.

20 Claims, 35 Drawing Sheets

(52) U.S. Cl.
CPC ............. *B60R 2011/0288* (2013.01); *B60R 2011/0294* (2013.01); *B60R 2300/10* (2013.01); *B60R 2300/406* (2013.01)

(58) Field of Classification Search
CPC ......... G06F 2009/45595; G06F 3/1423; G06F 9/452; G06F 9/45558; G09G 2380/10; H04L 65/61; H04L 67/12; H04N 21/26291; H04N 21/4122; H04N 21/41422; H04N 21/440218; H04N 21/4437; H04N 21/4586; H04N 21/8146; H04N 7/18
See application file for complete search history.

(56) References Cited

U.S. PATENT DOCUMENTS

| | | | | |
|---|---|---|---|---|
| 2012/0106653 | A1* | 5/2012 | Yousefi | B60R 19/03 375/E7.026 |
| 2020/0219469 | A1 | 7/2020 | Mittal et al. | |

FOREIGN PATENT DOCUMENTS

| | | | | |
|---|---|---|---|---|
| DE | 102014221247 | A1 * | 4/2016 | ........... B60R 16/023 |
| DE | 102019209086 | | 8/2020 | |
| EP | 3678022 | | 7/2020 | |
| KR | 1020160114703 | | 10/2016 | |

OTHER PUBLICATIONS

OpenSynergy, "Safe Multi-Display Cockpit Controller", White Paper, pp. 1-22, https://opensynergy.com/wp-content/uploads/2018/10/White_Paper_Cockpit_Controller.pdf>.,Oct. 2018, 24 pages.

Clocher, Cyril, "The Automotive Driver's Seat Revolution", HelloT, https://www.hellot.net/news/article_print.html?no=37649>., pp. 1-9, 27, Nov. 2017, 10 pages.

European Patent Office Application Serial No. 21889568.8, Search Report dated Aug. 22, 2024, 17 pages.

Product White Paper: "Safe Multi-Display Cockpit Controller," OpenSynergy, Oct. 2018, 22 pages.

* cited by examiner

DISPLAY APPARATUS FOR VEHICLE

CROSS-REFERENCE TO RELATED APPLICATIONS

This application is the National Stage filing under 35 U.S.C. 371 of International Application No. PCT/KR2021/015840, filed on Nov. 4, 2021, which claims the benefit of earlier filing date and right of priority to Korean Application No. 10-2020-0146349, filed on Nov. 4, 2020, the contents of which are all incorporated by reference herein in their entirety.

BACKGROUND OF THE DISCLOSURE

1. Field of the Disclosure

The present disclosure relates to a display apparatus for a vehicle, and more particularly to a display apparatus for a vehicle capable of capable of increasing transmission efficiency in case in which data is transmitted between a plurality of signal processing devices in a vehicle.

2. Description of the Related Art

A vehicle is an apparatus that a driver moves in a desired direction. A representative example of the vehicle is a car.

Meanwhile, a display apparatus for a vehicle is mounted in the vehicle for convenience of users who use the vehicle.

For example, a display is disposed in a cluster in order to display various kinds of information. Meanwhile, in order to display vehicle driving information, various displays such as an audio video navigation (AVN) display and a rear seat entertainment display, are mounted in the vehicle, in addition to the cluster.

As the number of displays in the display apparatus for a vehicle is increased, as described above, a plurality of signal processing devices for a plurality of displays is used.

Meanwhile, when the plurality of signal processing devices for the plurality of displays is used, resources may be inefficiently managed if the signal processing devices do not share data.

SUMMARY

An object of the present disclosure is to provide a display apparatus for a vehicle capable of increasing transmission efficiency in case in which data is transmitted between a plurality of signal processing devices in a vehicle.

Another object of the present disclosure is to provide a display apparatus for a vehicle capable of efficiently managing resources using a plurality of signal processing devices for a plurality of displays in a vehicle.

Another object of the present disclosure is to provide a display apparatus for a vehicle capable of increasing transmission efficiency in case in which data is transmitted between a plurality of virtual machines for a plurality of displays in a vehicle.

A further object of the present disclosure is to provide a display apparatus for a vehicle capable of performing high-speed data communication even though a plurality of virtual machines or a plurality of signal processing devices is driven by different operating systems.

In accordance with an aspect of the present disclosure, the above and other objects can be accomplished by the provision of a display apparatus for a vehicle, the display apparatus including a first display and a second display located in a vehicle; a signal processing device including a processor configured to perform signal processing for the first display and the second display; a third display located in the vehicle; and a second signal processing device including a second processor configured to perform signal processing for a third display, wherein, in case in which data is transmitted from the signal processing device to the second signal processing device, a data transmission method is changed based on the type of data.

Meanwhile, the processor in the signal processing device may be configured to execute a first virtual machine to a third virtual machine on a hypervisor in the processor, the second virtual machine may be configured to operate for the first display, the third virtual machine may be configured to operate for the second display, and the first virtual machine in the processor may be configured to change a data transmission method based on a type of the data, in response to transmitting data to the second signal processing device.

Meanwhile, the processor in the signal processing device may be configured to execute a first virtual machine to a third virtual machine on a hypervisor in the processor, and the first virtual machine in the processor may be configured to change a data transmission method based on a type of the data, in response to transmitting data to the second virtual machine or the third virtual machine.

Meanwhile, the signal processing device may be configured to classify categories into a plurality of levels based on software or application-use resources, and change the data transmission method based on the classified levels.

Meanwhile, the signal processing device may be configured to execute an information manager for managing an application list and information, a data processing manager for managing a data processing method in the application list, and an interface for outputting data to be transmitted in the virtual machine.

Meanwhile, the signal processing device may be configured to check the application list and information through the information manager and then change the data transmission method based on a classification level of an application in the application.

Meanwhile, the signal processing device may be configured to, in response to transmitting application data including video data and a graphic image, transcode and transmit encoded video data, and encode and transmit the graphic image.

Meanwhile, the second signal processing device may be configured to transcode and decode video data received from the signal processing device, decode the graphic image, synthesize the decoded video data and the decoded graphic image, and display a synthesized image.

Meanwhile, the signal processing device may be configured to, in response to transmitting application data including camera data and a graphic image, encode and transmit the graphic image, scale down and transmit the application data in case in which the camera data is less than or equal to a reference resolution, and scale down, encode, and transmit the application data in case in which the camera data exceeds the reference resolution.

Meanwhile, the second signal processing device may be configured to selectively decode camera data received from the signal processing device, synthesize the selectively decoded camera data and the decoded graphic image, and display a synthesized image.

Meanwhile, the signal processing device may be configured to, in response to transmitting application data including audio data and a graphic image, transcode and transmit encoded audio data, and encode and transmit the graphic image.

Meanwhile, the second signal processing device may be configured to transcode and decode audio data received from the signal processing device, output the decoded audio data, decode the graphic image, and display the decoded graphic image to be displayed.

Meanwhile, the signal processing device may be configured to, in response to transmitting application data including a graphic image, encode and transmit the graphic image, and the second signal processing device may be configured to decode the graphic image and display the decoded graphic image.

Meanwhile, the second signal processing device may be configured to transmit event occurrence information to the signal processing device in case in which an event occurs in the displayed graphic image.

Meanwhile, the signal processing device may be configured to, in case in which a new application that was not previously installed is installed and executed, transcode and transmit each of encoded video data and encoded audio data of the new application.

Meanwhile, the second signal processing device may be configured to transcode and decode video data and audio data received from the signal processing device, output the decoded audio data, and display the decoded video data.

Meanwhile, the signal processing device may be configured to, in response to executing the new application, periodically collect data, an event, and framework information, infer a category of the new application using a learning model, and change a data transmission method based on an inferred category.

In accordance with another aspect of the present disclosure, there is provided a display apparatus for a vehicle, the display apparatus including a first display and a second display located in a vehicle; and a signal processing device including a processor configured to perform signal processing for the first display and the second display, wherein the processor in the signal processing device may be configured to execute a first virtual machine to a third virtual machine on a hypervisor in the processor, the second virtual machine may be configured to operate for the first display, the third virtual machine may be configured to operate for the second display, and the first virtual machine in the processor may be configured to, in response to transmitting data to the second virtual machine or the third virtual machine, change a data transmission method based on a type of data.

Meanwhile, the first virtual machine may be configured to, in response to transmitting application data including video data and a graphic image, transcode and transmit encoded video data, and encode and transmit the graphic image.

Meanwhile, the first virtual machine may be configured to, in response to transmitting application data including camera data and a graphic image, encode and transmit the graphic image, scale down and transmit the application data in case in which the camera data is less than or equal to a reference resolution, and scale down, encode, and transmit the application data in case in which the camera data exceeds the reference resolution.

Meanwhile, the first virtual machine may be configured to, in response to transmitting application data including audio data and a graphic image, transcode and transmit encoded audio data, and encode and transmit the graphic image.

Effects of the Disclosure

A display apparatus for a vehicle according to an embodiment of the present disclosure includes a first display and a second display located in a vehicle; a signal processing device including a processor configured to perform signal processing for the first display and the second display; a third display located in the vehicle; and a second signal processing device including a second processor configured to perform signal processing for a third display, wherein, in case in which data is transmitted from the signal processing device to the second signal processing device, a data transmission method is changed based on the type of data. Accordingly, transmission efficiency during data transmission between a plurality of signal processing devices in the vehicle may be increased. In addition, it is possible to efficiently manage resources in the plurality of signal processing devices for a plurality of displays in the vehicle.

Meanwhile, the processor in the signal processing device may be configured to execute a first virtual machine to a third virtual machine on a hypervisor in the processor, the second virtual machine may be configured to operate for the first display, the third virtual machine may be configured to operate for the second display, and the first virtual machine in the processor may be configured to change a data transmission method based on a type of the data, in response to transmitting data to the second signal processing device. Consequently, transmission efficiency during data transmission between a plurality of signal processing devices in the vehicle may be increased.

Meanwhile, the processor in the signal processing device may be configured to execute a first virtual machine to a third virtual machine on a hypervisor in the processor, and the first virtual machine in the processor may be configured to change a data transmission method based on a type of the data, in response to transmitting data to the second virtual machine or the third virtual machine. Consequently, transmission efficiency during data transmission between a plurality of signal processing devices in the vehicle may be increased. In addition, it is possible to efficiently manage resources in the plurality of signal processing devices for a plurality of displays in the vehicle.

Meanwhile, the signal processing device may be configured to classify categories into a plurality of levels based on software or application-use resources, and change the data transmission method based on the classified levels. Consequently, transmission efficiency during data transmission between a plurality of signal processing devices in the vehicle may be increased.

Meanwhile, the signal processing device may be configured to execute an information manager for managing an application list and information, a data processing manager for managing a data processing method in the application list, and an interface for outputting data to be transmitted in the virtual machine. Consequently, transmission efficiency during data transmission between a plurality of signal processing devices in the vehicle may be increased.

Meanwhile, the signal processing device may be configured to check the application list and information through the information manager and then change the data transmission method based on a classification level of an application in the application. Consequently, transmission efficiency during data transmission between a plurality of signal processing devices in the vehicle may be increased.

Meanwhile, the signal processing device may be configured to, in response to transmitting application data including video data and a graphic image, transcode and transmit encoded video data and encode and transmit the graphic image. In particular, by transcoding and transmitting video data without decoding, transmission efficiency during data transmission between a plurality of signal processing devices in the vehicle may be increased.

Meanwhile, the second signal processing device may be configured to transcode and decode video data received from the signal processing device, decode the graphic image, synthesize the decoded video data and the decoded graphic image, and display a synthesized image. Consequently, transmission efficiency during data transmission between a plurality of signal processing devices in the vehicle may be increased.

Meanwhile, the signal processing device may be configured to, in response to transmitting application data including camera data and a graphic image, encode and transmit the graphic image, scale down and transmit the application data in case in which the camera data is less than or equal to a reference resolution, and scale down, encode, and transmit the application data in case in which the camera data exceeds the reference resolution. In particular, low-resolution camera data may be transmitted without encoding, so that transmission efficiency during data transmission between a plurality of signal processing devices in the vehicle may be increased.

Meanwhile, the second signal processing device may be configured to selectively decode camera data received from the signal processing device, synthesize the selectively decoded camera data and the decoded graphic image, and display a synthesized image. Consequently, transmission efficiency during data transmission between a plurality of signal processing devices in the vehicle may be increased.

Meanwhile, the signal processing device may be configured to, in response to transmitting application data including audio data and a graphic image, transcode and transmit encoded audio data, and encode and transmit the graphic image. In particular, by transmitting encoded audio data without decoding, transmission efficiency during data transmission between a plurality of signal processing devices in the vehicle may be increased.

Meanwhile, the second signal processing device may be configured to transcode and decode audio data received from the signal processing device, output the decoded audio data, decode the graphic image, and display the decoded graphic image to be displayed. Consequently, transmission efficiency during data transmission between a plurality of signal processing devices in the vehicle may be increased.

Meanwhile, the signal processing device may be configured to, in response to transmitting application data including a graphic image, encode and transmit the graphic image, and the second signal processing device may be configured to decode the graphic image and display the decoded graphic image. Consequently, transmission efficiency during data transmission between a plurality of signal processing devices in the vehicle may be increased.

Meanwhile, the second signal processing device may be configured to transmit event occurrence information to the signal processing device in case in which an event occurs in the displayed graphic image. Consequently, transmission efficiency during data transmission between a plurality of signal processing devices in the vehicle may be increased.

Meanwhile, the signal processing device may be configured to, in case in which a new application that was not previously installed is installed and executed, transcode and transmit each of encoded video data and encoded audio data of the new application. In particular, by transmitting encoded video data and encoded audio data without separate decoding, transmission efficiency during data transmission between a plurality of signal processing devices in the vehicle may be increased.

Meanwhile, the second signal processing device may be configured to transcode and decode video data and audio data received from the signal processing device, output the decoded audio data, and display the decoded video data. Consequently, transmission efficiency during data transmission between a plurality of signal processing devices in the vehicle may be increased.

Meanwhile, the signal processing device may be configured to, in response to executing the new application, periodically collect data, an event, and framework information, infer a category of the new application using a learning model, and change a data transmission method based on an inferred category. Consequently, transmission efficiency during data transmission between a plurality of signal processing devices in the vehicle may be increased.

A display apparatus for a vehicle according to another embodiment of the present disclosure includes a first display and a second display located in a vehicle; and a signal processing device including a processor configured to perform signal processing for the first display and the second display, wherein the processor in the signal processing device may be configured to execute a first virtual machine to a third virtual machine on a hypervisor in the processor, the second virtual machine may be configured to operate for the first display, the third virtual machine may be configured to operate for the second display, and the first virtual machine in the processor may be configured to, in response to transmitting data to the second virtual machine or the third virtual machine, change a data transmission method based on a type of data. Consequently, transmission efficiency during data transmission between a plurality of virtual machines in the vehicle may be increased. In addition, it is possible to efficiently manage resources in the plurality of virtual machines for a plurality of displays in the vehicle.

Meanwhile, the first virtual machine may be configured to, in response to transmitting application data including video data and a graphic image, transcode and transmit encoded video data and encode and transmit the graphic image. In particular, by transmitting encoded video data without separate decoding, transmission efficiency during data transmission between a plurality of signal processing devices in the vehicle may be increased.

Meanwhile, the first virtual machine may be configured to, in response to transmitting application data including camera data and a graphic image, encode and transmit the graphic image, scale down and transmit the application data in case in which the camera data is less than or equal to a reference resolution, and scale down, encode, and transmit the application data in case in which the camera data exceeds the reference resolution. In particular, by transmitting low-resolution camera data without separate encoding, transmission efficiency during data transmission between a plurality of signal processing devices in the vehicle may be increased.

Meanwhile, the first virtual machine may be configured to, in response to transmitting application data including audio data and a graphic image, transcode and transmit encoded audio data, and encode and transmit the graphic image. In particular, by transmitting encoded audio data without separate decoding, transmission efficiency during data transmission between a plurality of signal processing devices in the vehicle may be increased.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
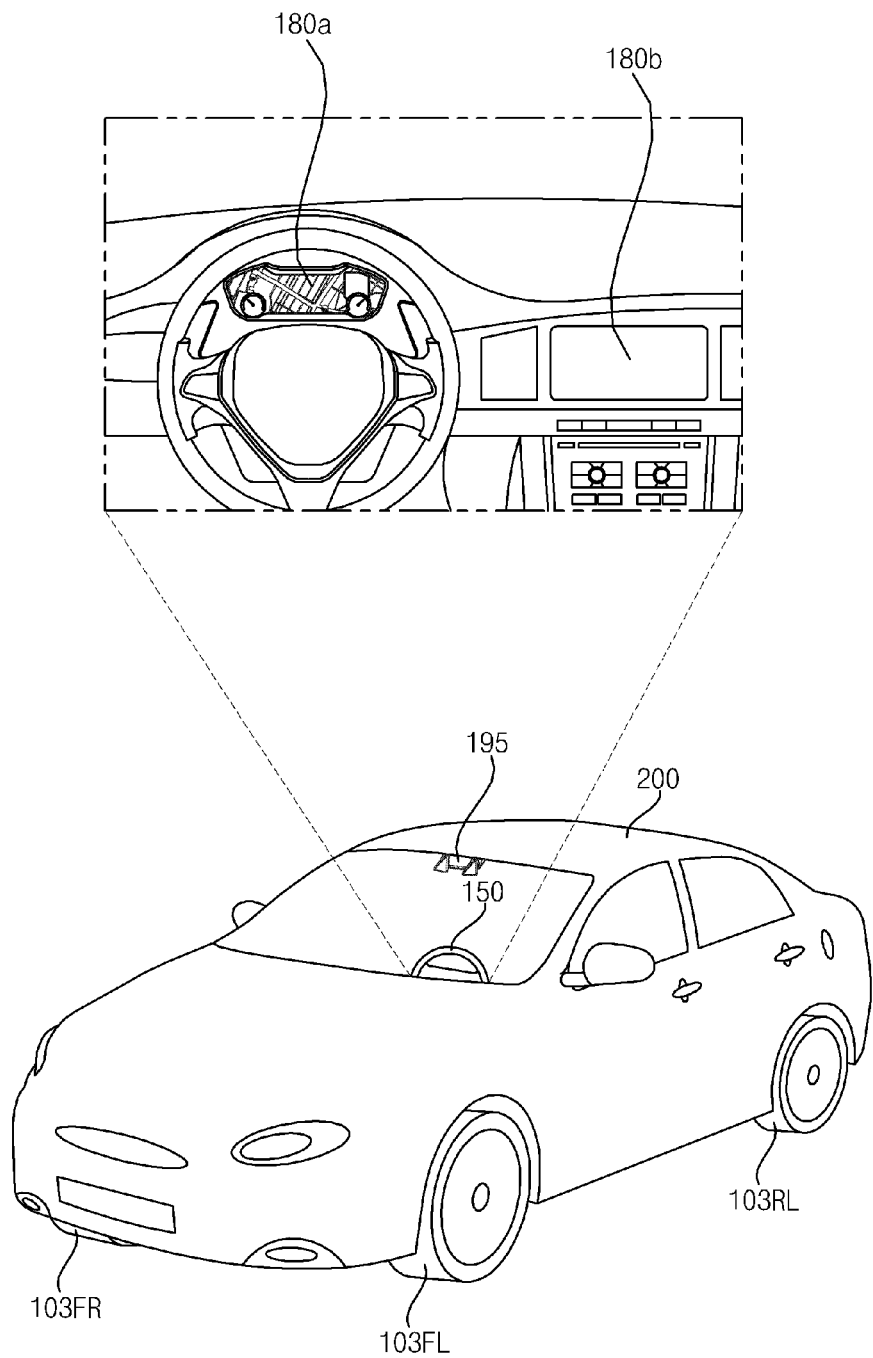
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

The embodiment of the present disclosure proposes a scheme for a display apparatus 100 for vehicle including a plurality of displays 180a and 180b to divide data processing.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
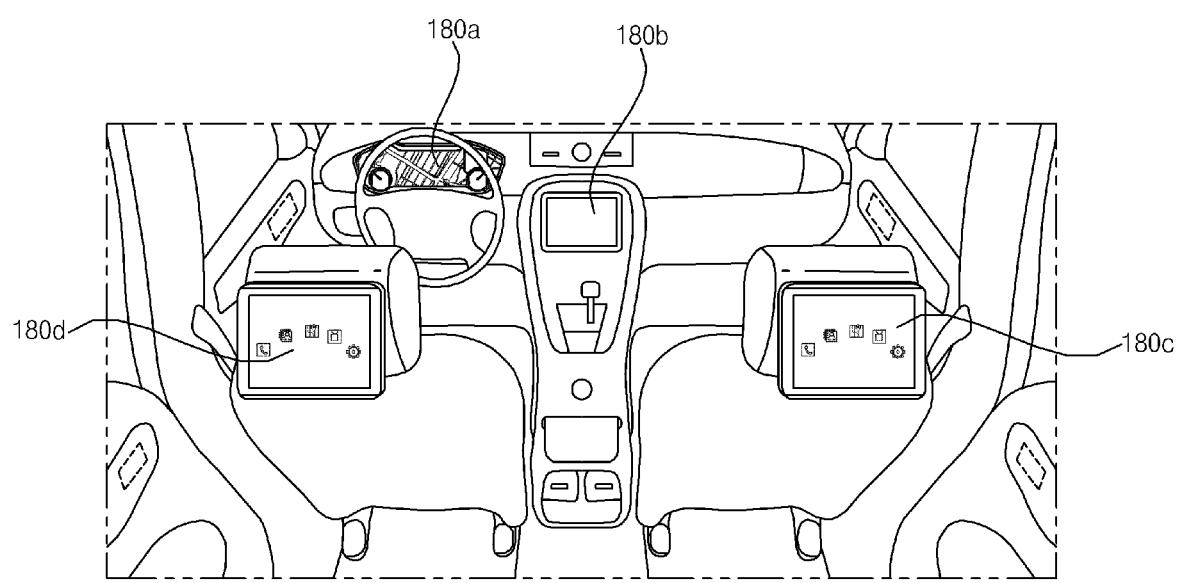
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be mounted in the vehicle.

Figure 2:
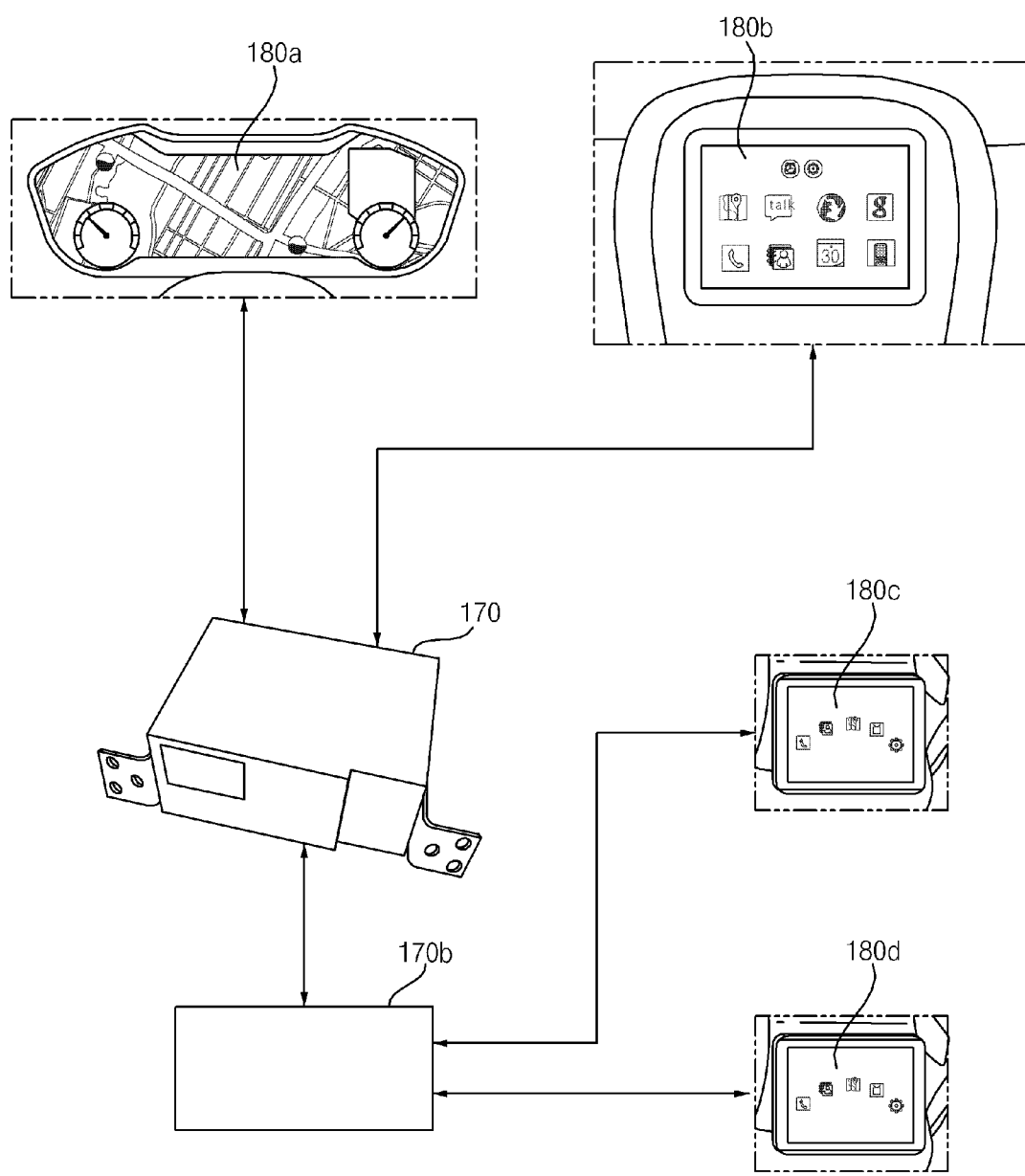
FIG. 2 is a view showing the external appearance of a display apparatus for a vehicle according to an embodiment of the present disclosure.

FIG. 2 is a view showing the external appearance of a display apparatus for a vehicle according to an embodiment of the present disclosure.

The display apparatus 100 for vehicle according to the embodiment of the present disclosure may include a plurality of displays 180a and 180b, a signal processing device 170 configured to perform signal processing in order to display images and information on the plurality of displays 180a and 180b, at least one display 180c and 180d, and a second signal processing device 170b configured to perform signal processing in order to display images and information on the at least one display 180c and 180d.

The signal processing device 170 and the second signal processing device 170b may be disposed spaced apart from each other.

Meanwhile, the second signal processing device 170b may be operated based on a different operating system (OS) than the signal processing device 170.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

In the at least one display 180c and 180d, the third display 180c may be a right rear seat entertainment display of the vehicle, and the fourth display 180d may be a left rear seat entertainment display of the vehicle.

The at least one display 180c and 180d may display driving state information, simple navigation information, various kinds of entertainment information, or an image.

The signal processing device 170 may have a processor 175 provided therein, and first to third virtual machines 520 to 540 may be executed by a hypervisor 505 in the processor 175.

The first virtual machine 520 may correspond to a server virtual machine, and the second and third virtual machines may correspond to guest virtual machines.

Consequently, data communication may be performed between the first virtual machine 520 and the second or third virtual machine 530 or 540 according to a server interface and a client interface.

The second virtual machine 530 may be operated for the first display 180a, and the third virtual machine 540 may be operated for the second display 180b.

Meanwhile, the first virtual machine 520 in the processor 175 shares at least some of data with the second virtual machine 530 and the third virtual machine 540 for divided processing of data.

Meanwhile, the first virtual machine 520 in the processor 175 may receive and process wheel speed sensor data of the vehicle, and may transmit the processed wheel speed sensor data to at least one of the second virtual machine 530 or the third virtual machine 540 or the second signal processing device 170b. Consequently, at least one virtual machine may share the wheel speed sensor data of the vehicle.

Meanwhile, the first virtual machine 520 in the processor 175 writes some of data in a first shared memory 508a to be transmitted to the second virtual machine 530, and writes some other of data in the first shared memory 508a to be transmitted to the third virtual machine 540. The second virtual machine 530 and the third virtual machine 540 are configured to process the received data, and write the processed data in a second shared memory (not shown). Consequently, the plurality of signal processing devices in the vehicle may efficiently perform data processing.

Meanwhile, the first virtual machine 520 in the processor 175 may be configured to set a shared memory 508 based on the hypervisor 505 for transmission of the same data to the second virtual machine 530 and the third virtual machine 540. Consequently, the first display 180a and the second display 180b in the vehicle may display the same information or the same images in a synchronized state.

The signal processing device 170 may have the processor 175 therein, and may execute the first to third virtual machines 520 to 540 on the hypervisor 505 in the processor 175.

The first virtual machine 520 may correspond to a server virtual machine, and the second and third virtual machines may correspond to guest virtual machines.

Consequently, data communication may be performed between the first virtual machine 520 and the second or third virtual machine 530 or 540 according to the server interface and the client interface.

Meanwhile, the second signal processing device 170b may have a second processor 175b therein, and may execute a server virtual machine VIMc and a guest virtual machine VIMd on a hypervisor 505b in the second processor 175b.

Meanwhile, some of the plurality of displays 180a to 180d may be operated based on a Linux Operating System (OS), and others may be operated based on a Web Operating System (OS).

The signal processing device 170 and the second signal processing device 170b according to the embodiment of the present disclosure may divide and process data for the displays 180a to 180d configured to be operated under various operating systems.

Meanwhile, the signal processing device 170 and the second signal processing device 170b according to the embodiment of the present disclosure may be configured to operate the displays 180a to 180d under various operating systems also display the same information or the same images in a synchronized state.

Meanwhile, the signal processing device 170 and the second signal processing device 170b according to the embodiment of the present disclosure may share at least some of data for divided processing of the data.

Consequently, the plurality of signal processing devices 170 and 170b for the plurality of displays in the vehicle may divide and process data. In addition, the plurality of signal processing devices 170 and 170b may efficiently manage resources.

Figure 3:
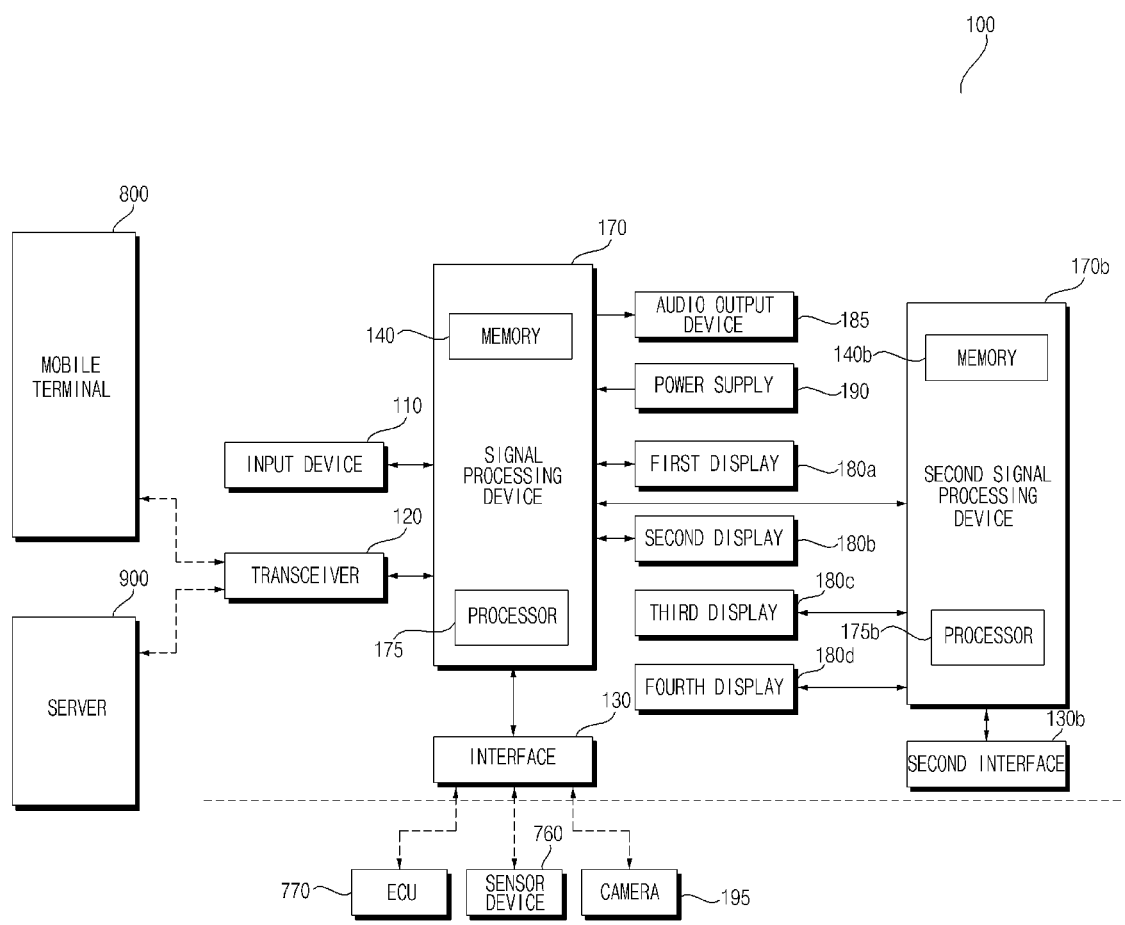
FIG. 3 illustrates an example of an internal block diagram of the display apparatus for a vehicle of FIG. 2.

FIG. 3 illustrates an example of an internal block diagram of the display apparatus for a vehicle according to the embodiment of the present disclosure.

Referring to the figure, the display apparatus 100 for a vehicle according to the embodiment of the present disclosure may include an input device 110, a transceiver 120, an interface 130, a second interface 130b, a signal processing device 170, a second signal processing device 170b, a plurality of displays 180a to 180d, an audio output device 185, and a power supply 190.

The input device 110 may include a physical button or pad for button input or touch input.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes such as Bluetooth, Wi-Fi, WIFI Direct, and APIX, may be used as a wireless data communication scheme.

The transceiver 120 may receive weather information and road traffic situation information such as transport protocol expert group (TPEG) information, from the mobile terminal 800 or the server 900. To this end, the transceiver 120 may include a mobile communication module (not shown).

The interface 130 may receive sensor information from an electronic control unit (ECU) 770 or a sensor device 760, and may transmit the received information to the signal processing device 170.

The second interface 130b may receive sensor information from the electronic control unit (ECU) 770 or the sensor device 760, and may transmit the received information to the second signal processing device 170b.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The memory 140 may store various data necessary for overall operation of the display apparatus 100 for vehicle such as programs for processing or control of the signal processing device 170.

For example, the memory 140 may store data about the hypervisor and first to third virtual machines executed by the hypervisor in the processor 175.

Meanwhile, the memory 140 may be included in the signal processing device 170 as shown in the drawing, but is not limited thereto and may be disposed outside the signal processing device 170.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicle.

For example, the signal processing device 170 may include a processor 175 configured to perform signal processing for the displays 180a and 180b and a memory 140.

The processor 175 may execute the first to third virtual machines 520 to 540 on the hypervisor 505 (see FIG. 5) in the processor 175.

Among the first to third virtual machines 520 to 540 (see FIG. 5), the first virtual machine 520 may be called a server virtual machine, and the second and third virtual machines 530 and 540 may be called guest virtual machines.

The second virtual machine 530 may be operated for the first display 180a, and the third virtual machine 540 may be operated for the second display 180b.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing may be achieved.

As another example, the first virtual machine 520 may directly receive and process may communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the first virtual machine 520 in the processor 175 writes some of data in the first shared memory 508a to be transmitted to the second virtual machine 530, and writes some other of data in the first shared memory 508a to be transmitted to the third virtual machine 540. The second virtual machine 530 and the third virtual machine 540 are configured to process the received data, and write the processed data in the second shared memory (not shown). Accordingly, data may be efficiently processed between a plurality of signal processing devices in the vehicle.

At this time, data may be any one of image data, audio data, navigation data, and voice recognition data.

Meanwhile, the first virtual machine 520 may process some other of data, and may be configured to write the processed data in the second shared memory (not shown). That is, the first virtual machine 520 may perform data processing in addition to the second virtual machine 530 and the third virtual machine 540.

Meanwhile, the first virtual machine 520 may create command queues for distributed processing of data in the second virtual machine 530 and the third virtual machine 540. Consequently, the plurality of virtual machines may divide and process data.

Meanwhile, in response to the second virtual machine 530 and the third virtual machine 540 sharing the same data, the first virtual machine 520 in the processor 175 may create one command queue. Consequently, the same data may be synchronized and shared.

Meanwhile, the first virtual machine 520 may create command queues corresponding to the number of virtual machines for distributed processing of data.

Meanwhile, the first virtual machine 520 may be configured to transmit at least some of data to at least one of the second virtual machine 530 or the third virtual machine 540 or the second signal processing device 170b for distributed processing of data.

For example, the first virtual machine 520 may allocate the first shared memory 508a for transmitting at least some of data to at least one of the second virtual machine 530 or the third virtual machine 540 or the second signal processing device 170b, and image data processed by the second virtual machine 530 or the third virtual machine 540 may be written in the second shared memory (not shown).

Meanwhile, the first virtual machine 520 may be configured to write data in the shared memory 508, whereby the second virtual machine 530 and the third virtual machine 540 share the same data.

For example, the first virtual machine 520 may perform control such that radio data or wireless communication data are written in the shared memory 508, whereby the second virtual machine 530 and the third virtual machine 540 share the same data. Consequently, 1:N data sharing may be achieved.

Eventually, the first virtual machine 520 may process most of the data, whereby 1:N data sharing may be achieved.

Meanwhile, the first virtual machine 520 in the processor 175 may be configured to set the shared memory 508 based on the hypervisor 505 in order to transmit the same data to the second virtual machine 530 and the third virtual machine 540.

That is, the first virtual machine 520 in the processor 175 may transmit the same data to the second virtual machine 530 and the third virtual machine 540 in a synchronized state using the shared memory 508 based on the hypervisor 505. Consequently, the plurality of displays 180a and 180b in the vehicle may display the same images in a synchronized state.

Meanwhile, the signal processing device 170 may process various signals such as an audio signal, an image signal, and a data signal. To this end, the signal processing device 170 may be implemented in the form of a system on chip (SOC).

The second signal processing device 170b performs signal processing for the displays 180c and 180d for a vehicle, and may include a second processor 175b and a second memory 140b to this end.

The second processor 175b may execute the server virtual machine VIMc (FIG. 9) and the guest virtual machines VIMd (FIG. 9) on the hypervisor 505b (FIG. 9) in the second processor 175b.

For example, the server virtual machine VIMc in the second processor 175b may receive, process, and output vehicle sensor data, position information data, camera image data, audio data, or touch input data from the first virtual machine 520 in the processor 175 in the signal processing device 170.

As another example, the server virtual machine VIMc may receive and process communication data, audio data, radio data, USB data, and wireless communication data from the first virtual machine 520 in the processor 175 in the signal processing device 170 for the guest virtual machines VIMd.

The server virtual machine VIMc may transmit the processed data to the guest virtual machines VIMd.

Consequently, only the server virtual machine VIMc, among the server virtual machine VIMc and the guest virtual machines VIMd, may receive communication data and external input data, and may perform signal processing, whereby signal processing load of the guest virtual machines VIMd may be reduced and 1:N data communication may be achieved, and therefore synchronization at the time of data sharing may be achieved.

Meanwhile, the server virtual machine VIMc writes some of data in the shared memory 508a to be transmitted to the guest virtual machine 530b, and the guest virtual machines VIMd process the received data, and may be configured to write the processed data in the shared memory (not shown). Consequently, the plurality of signal processing devices for the plurality of displays in the vehicle may divide and process data.

At this time, data may be any one of image data, audio data, navigation data, and voice recognition data.

Meanwhile, the server virtual machine VIMc may create command queues for distributed processing of data in the plurality of virtual machines. Consequently, the plurality of virtual machines may divide and process data.

Meanwhile, in response to the plurality of virtual machines sharing the same data, the server virtual machine VIMc in the second processor 175*b* may create one command queue. Consequently, the same data may be synchronized and shared.

Meanwhile, the server virtual machine VIMc may create command queues corresponding to the number of virtual machines for distributed processing of data.

Meanwhile, the server virtual machine VIMc may be configured to transmit at least some of data to the guest virtual machine VIMd for distributed processing of data. For example, the server virtual machine VIMc may allocate the shared memory (not shown) for transmitting at least some of data to the guest virtual machine VIMd, and image data processed by the guest virtual machine VMd may be written in the shared memory (not shown).

Meanwhile, the server virtual machine VIMc may be configured to write data in the shared memory (not shown), whereby the guest virtual machines VIMd share the same data.

For example, the server virtual machine VIMc may be configured to write radio data or wireless communication data in the shared memory (not shown), whereby the guest virtual machines VIMd share the same data. Consequently, 1:N data sharing may be achieved.

Eventually, the server virtual machine VIMc may process most of the data, whereby 1:N data sharing may be achieved.

Meanwhile, the server virtual machine VIMc in the second processor 175*b* may be configured to set the shared memory (not shown) based on the hypervisor 505*b* in order to transmit the same data to the guest virtual machines VIMd.

That is, the server virtual machine VIMc in the second processor 175*b* may transmit the same data to the guest virtual machines VIMd in a synchronized state using the shared memory (not shown) based on the hypervisor 505*b*. Consequently, the plurality of displays 180*a* to 180*d* in the vehicle may display the same images in a synchronized state.

Meanwhile, the second signal processing device 170*b* may process various signals such as an audio signal, an image signal, and a data signal. To this end, the second signal processing device 170*b* may be implemented in the form of a system on chip (SOC).

Figure 4:
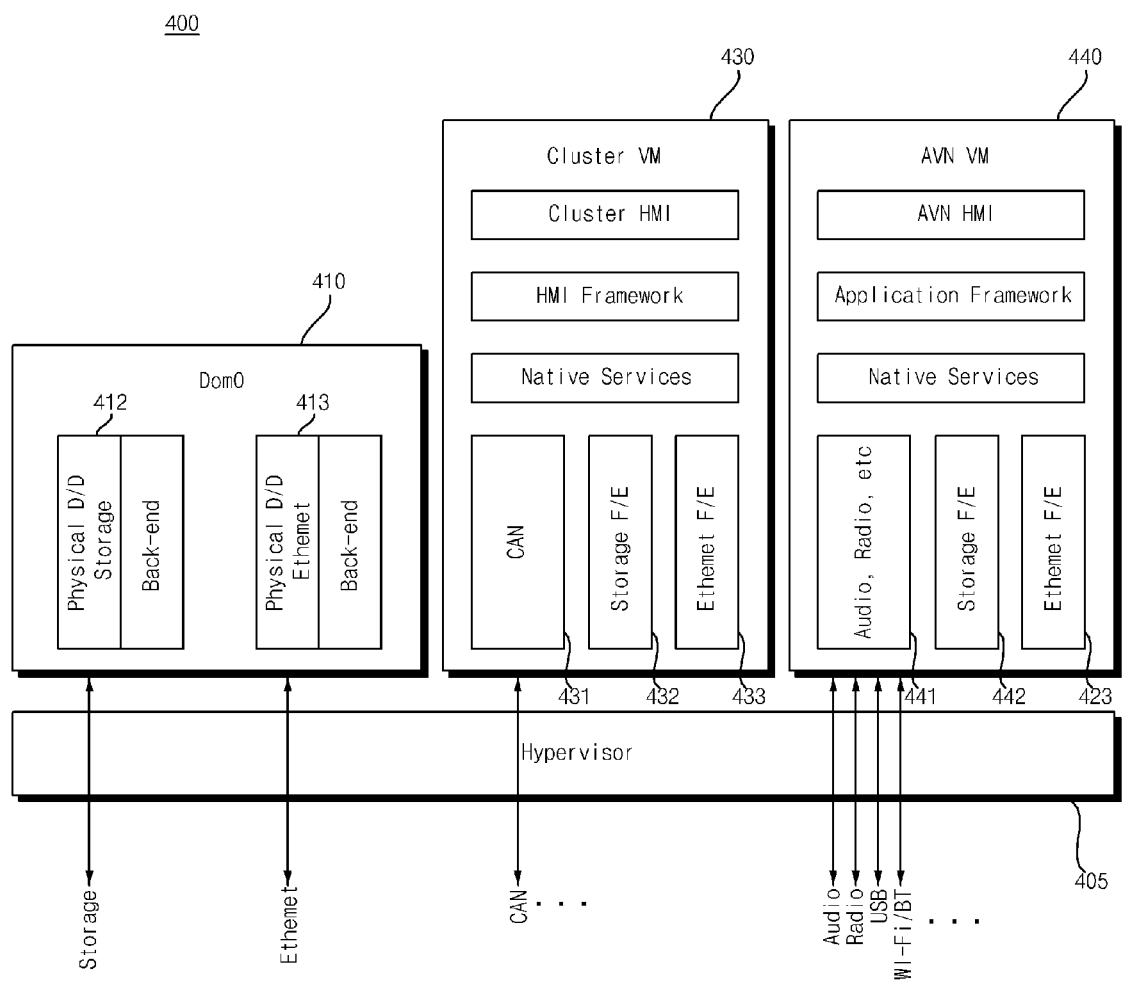
FIG. 4 is a view showing a system driven in a signal processing device related to the present disclosure.

FIG. 4 is a view showing a system driven in a signal processing device related to the present disclosure.

Referring to the figure, FIG. 4 is a view illustrating that virtual machines are used for the cluster display 180*a* and the AVN display 180*b*.

The system 400 driven in the signal processing device of FIG. 4 illustrates that a cluster virtual machine 430 and an AVN virtual machine 440 are executed on a hypervisor 405 in the processor 175 in the signal processing device 170.

Meanwhile, the system 400 driven in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for may communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that may communication data are input and output only in the cluster virtual machine 430, whereby the may communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the cluster virtual machine 430 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines such that various memory data and communication data are input and output not in the guest virtual machines but in the server virtual machine. This will be described with reference to FIG. 5 and subsequent figures.

Figure 5:
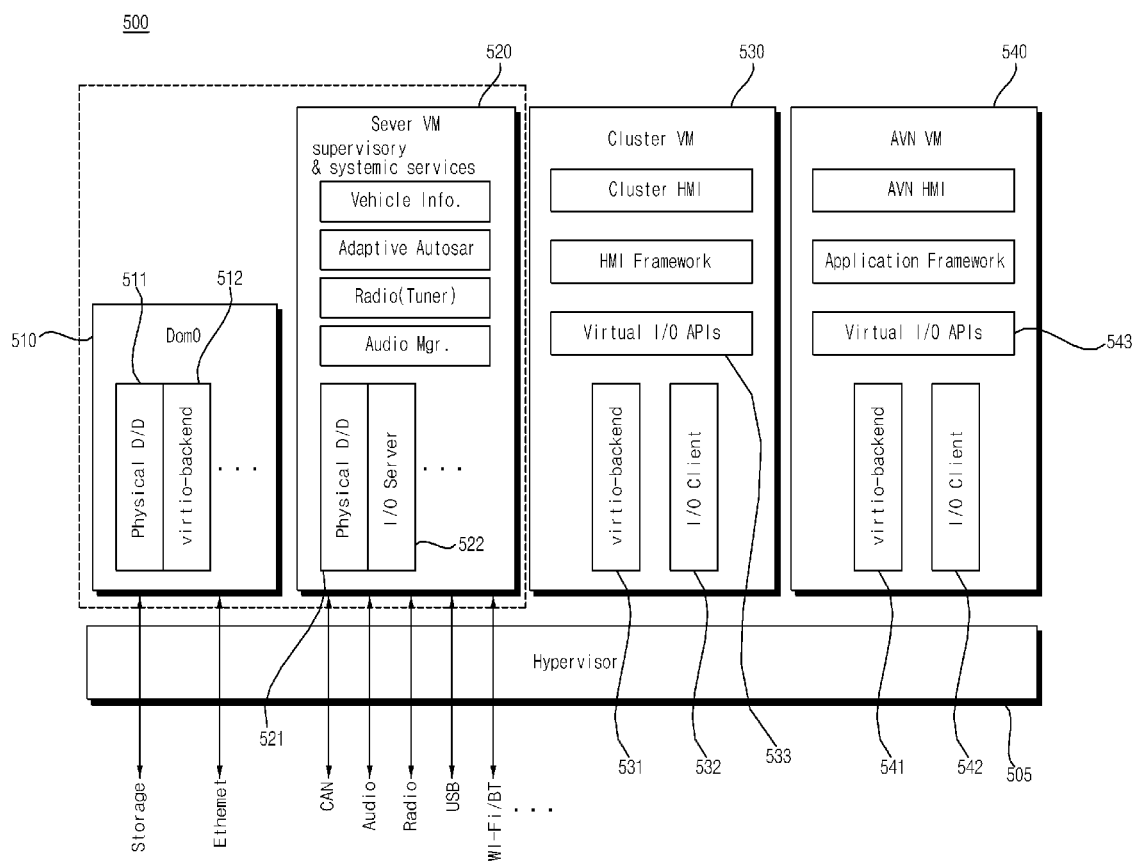
FIG. 5 is a view showing an example of a system driven in a signal processing device according to an embodiment of the present disclosure.

FIG. 5 is a view showing an example of a system driven in a signal processing device according to an embodiment of the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180*a*, and the third virtual machine 540 may be a virtual machine for the AVN display 180*b*.

That is, the second virtual machine 530 and the third virtual machine 540 may be operated for image rendering of the cluster display 180*a* and the AVN display 180*b*, respectively.

Meanwhile, the system 50 driven in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 and Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memory 140 and Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, may communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images may be shared in a synchronized state. Eventually, the plurality of displays 180a and 180b may display the same data or the same images in a synchronized state.

Figure 6:
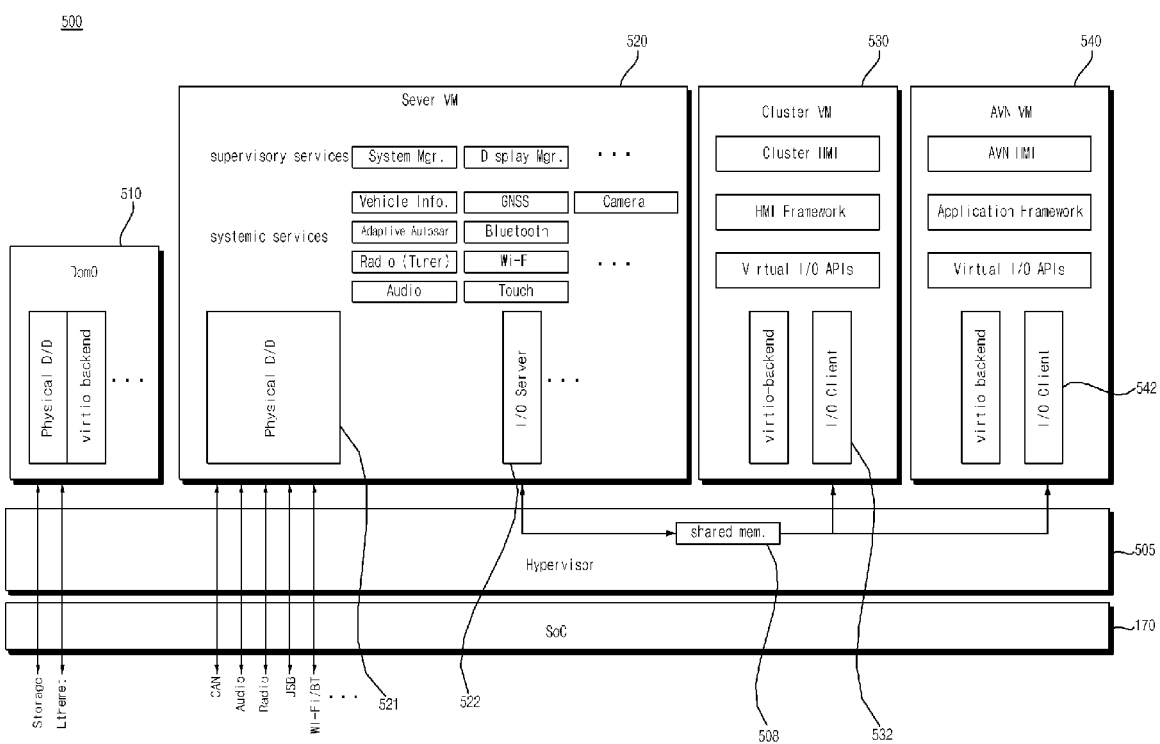
FIG. 6 is a view referred to in the description of operation of the system driven in the signal processing device according to the embodiment of the present disclosure.

FIG. 6 is a view referred to in the description of operation of the system driven in the signal processing device according to the embodiment of the present disclosure.

Referring to the figure, the processor 175 in the signal processing device 170 executes the first to third virtual machines 520 to 540 on the hypervisor 505 in the processor 175, and the first virtual machine 520 in the processor 175 is configured to set the shared memory 508 based on the hypervisor 505 for transmission of the same data to the second and third virtual machines 530 and 540.

For example, the same image data may be illustrated as the same data. Consequently, the plurality of displays 180a and 180b in the vehicle may display the same images in a synchronized state.

Meanwhile, in the system 500 of FIG. 6, the processor 175 in the signal processing device 170 executes the first to third virtual machines 520 to 540 on the hypervisor 505 in the processor 175, and the first virtual machine 520 in the processor 175 may transmit the same data to the second and third virtual machines 530 and 540 in a synchronized state using the shared memory 508 based on the hypervisor 505.

For example, may communication data, audio data, radio data, USB data, wireless communication data, position information data, or touch data may be illustrated as the same data. Consequently, the plurality of displays 180a and 180b in the vehicle may display the same data in a synchronized state.

Meanwhile, although not shown in FIG. 6, the legacy virtual machine 510 may transmit memory data from the memory 140 and Ethernet data by Ethernet communication to the second and third virtual machines 530 and 540 in a synchronized state using the shared memory 508 based on the hypervisor 505. That is, it is possible to perform 1:N data communication with respect to the memory data or the Ethernet data, whereby it is possible to transmit the same data in a synchronized state.

FIGS. 7 to 29 are views referred to in the description of a display apparatus for a vehicle according to an embodiment of the present disclosure.

Figure 7:
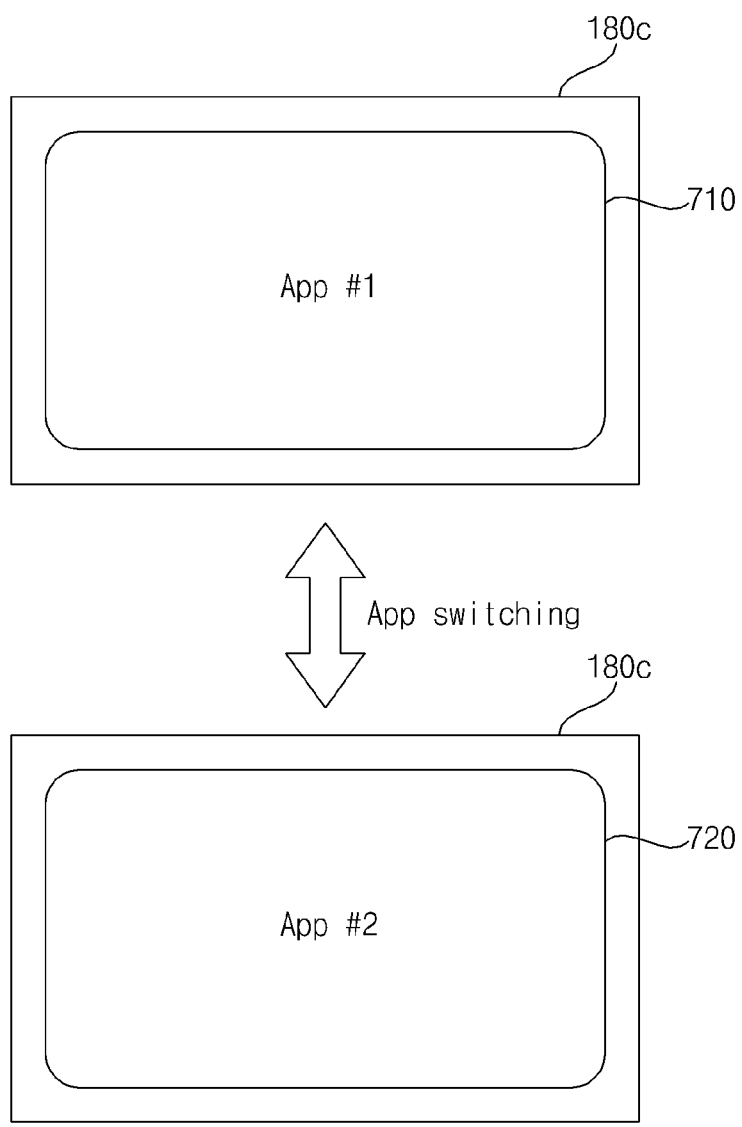
FIGS. 7 to 29 are views referred to in the description of a display apparatus for a vehicle according to an embodiment of the present disclosure.

FIG. 7 illustrates that a first application 710 is executed on the third display 180c and then switched to a second application 720.

Referring to the figure, when the first application 710 is executed on the third display 180c and then switched to the second application 720, the signal processing device 170 transmits data related to the second application to the second signal processing device 170b controlling the third display 180c.

Meanwhile, when the data related to the second application is multimedia data, a high bandwidth is required for data transmission, and thus, it is preferable to use an optimized bandwidth.

Meanwhile, when a large amount of multimedia data is transmitted between the signal processing device 170 and the second signal processing device 170b, there is a disadvantage in that data cannot be transmitted in real time.

Meanwhile, when video data or audio data is decoded and transmitted between the signal processing device 170 and the second signal processing device 170b during data transmission, transmission efficiency may be lowered due to a frame rate.

To this end, in an embodiment of the present disclosure, in case in which data is transmitted between the signal processing device 170 and the second signal processing device 170b, a method of changing a data transmission method based on the type of data is proposed.

Specifically, a data transmission method is varied depending on whether the data transmitted from the signal processing device 170 to the second signal processing device 170b is application data including video data and graphic images, application data including camera data and graphic images, application data including audio data and graphic images, or new application data that is not installed. This will be described with reference to FIG. 8 below.

Figure 8:
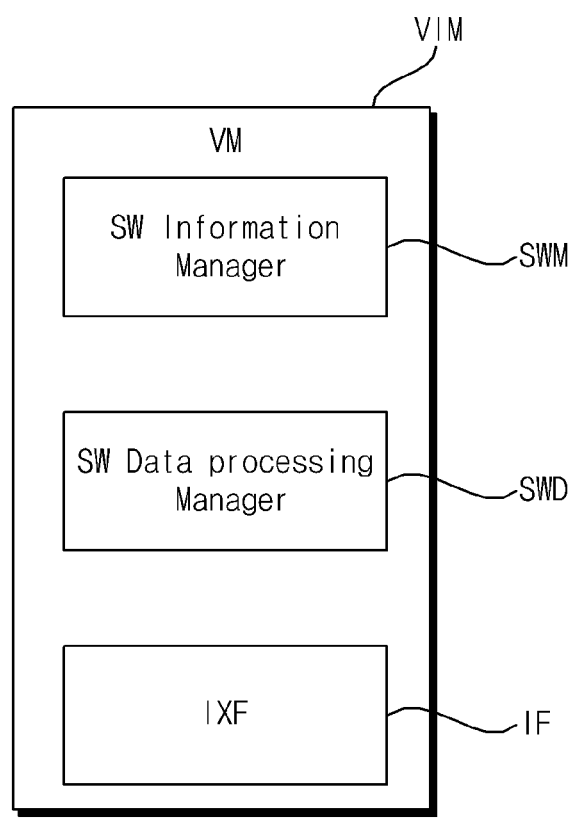

FIG. 8 is an internal block diagram of a virtual machine according to an embodiment of the present disclosure.

Referring to the figure, for efficient data transmission, a virtual machine (VIM) according to an embodiment of the present disclosure includes an information manager SWM for managing an application list and information, a data processing manager SWD managing a data processing method in the application list, and an interface IF outputting data to be transmitted.

To this end, the signal processing device 170 according to an embodiment of the present disclosure may drive the information manager SWM managing an application list and information, the data processing manager SWD managing a data processing method in the application list, and the interface IF outputting data to be transmitted, within the virtual machine (VIM). The information manager SWM may manage an application list and information requiring data transmission between the plurality of signal processing devices 170 and 170b or between the plurality of virtual machines 520, 530, and 540.

Meanwhile, the information manager SWM may share various hardware resource information required for transmission optimization.

Meanwhile, the information manager SWM may collect data of new software or a new application additionally installed in the signal processing device 170 or the second signal processing device 170b, infer a category of the new application using a learning model, such as deep learning, and determine or classify a data transmission method based on an inferred category.

Meanwhile, the data processing manager SWD may determine a data processing method according to a method defined when driving software or applications in a list in the information manager SWM.

For example, the data processing manager SWD may determine an encoding parameter of video data, an encoding parameter of audio data, or compression.

The interface IF efficiently transmits data to the signal processing device (170 or 170b) or virtual machine to be transmitted based on a data type determined by the data processing manager SWD.

Figure 9:
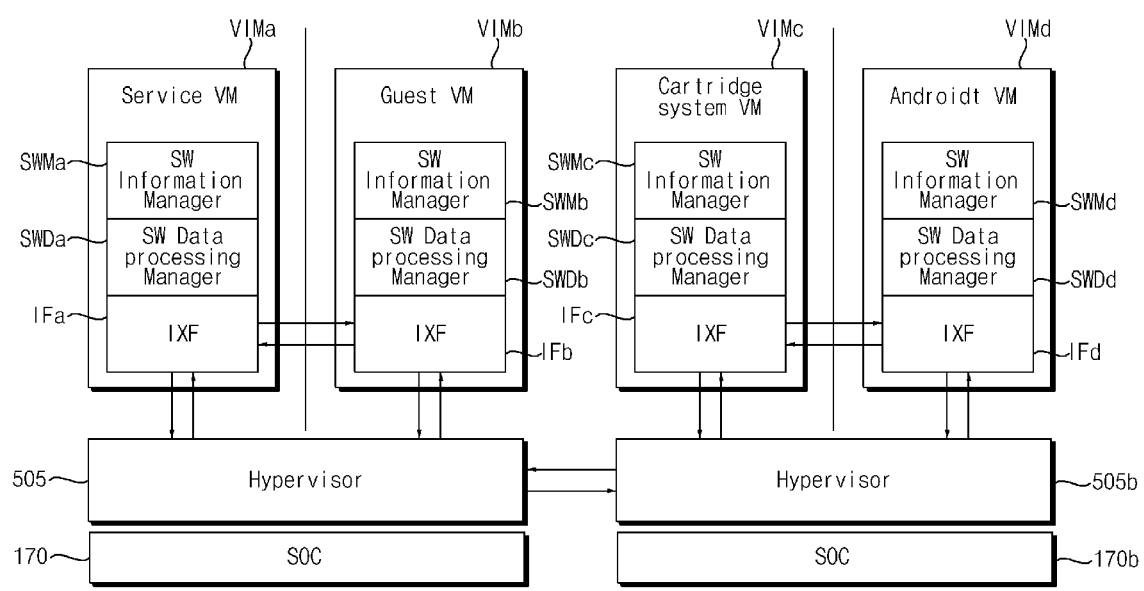

FIG. 9 is a diagram illustrating an example of an operating method of a plurality of signal processing devices according to an embodiment of the present disclosure.

Referring to the figure, the signal processing device 170 may drive a hypervisor 505 on an internal processor 175, and execute a server virtual machine 520 and a guest virtual machine 530 on the hypervisor 505.

Meanwhile, the second signal processing device 170b may drive a hypervisor 505b on an internal second processor 175b, and drive a cartridge system virtual machine VIMb and an Android virtual machine VIMd on the hypervisor 505b.

The server virtual machine 520 driven in the signal processing device 170 may drive the information manager SWMa, the data processing manager SWDa, and the interface IFa described above in FIG. 8.

The guest virtual machine 530 driven in the signal processing device 170 may drive the information manager SWMb, the data processing manager SWDb, and the interface IFb described in FIG. 8.

Meanwhile, data transmission between the server virtual machine 520 and the guest virtual machine 530 may be performed through respective interfaces IFa and IFb.

The cartridge system virtual machine VIMc driven in the second signal processing device 170b may drive the information manager SWMc, the data processing manager SWDc, and the interface IFc described in FIG. 8.

The Android virtual machine VIMd driven in the second signal processing device 170b may drive the information manager SWMd, the data processing manager SWDd, and the interface IFd described in FIG. 8.

Meanwhile, data transmission between the signal processing device 170 and the second signal processing device 170b may be performed through respective hypervisors 505 and 505b and respective interfaces IFa, IFb, IFc, and IFd.

Meanwhile, in case in which data is transmitted from the signal processing device 170 to the second signal processing device 170b according to an embodiment of the present disclosure, a data transmission method is changed based on the type of data.

Accordingly, transmission efficiency during data transmission may be increased. In addition, a transmission line may be efficiently used and transmission may be reliably performed according to the importance of transmission data. Furthermore, hardware resource usage may be reduced through efficiency of transmission.

For example, in response to transmitting encoded video data or encoded audio data from the signal processing device 170 to the second signal processing device 170b according to an embodiment of the present disclosure, the encoded video data or encoded audio data may be transmitted after performing transcoding without a decoding process, so that transmission efficiency during data transmission may be increased. In particular, hardware resource usage may be reduced.

Meanwhile, the first virtual machine 520 in the processor 175 in the signal processing device 170 may control to change the data transmission method based on the type of data in case in which data is transmitted to the second signal processing device 170b. Accordingly, transmission efficiency during data transmission between the plurality of signal processing devices 170 and 170b in the vehicle 200 may be increased.

Meanwhile, the first virtual machine 520 in the processor 175 in the signal processing device 170 may change a data transmission method based on the type of data in response to transmitting data to the second virtual machine 530 or the third virtual machine 540. Accordingly, transmission efficiency during data transmission between a plurality of virtual machines in the vehicle 200 may be increased. In addition, it is possible to efficiently manage resources in a plurality of virtual machines for a plurality of displays in the vehicle 200.

Meanwhile, the signal processing device 170 may classify categories into a plurality of levels based on software or application-use resources and change a data transmission method based on the classified levels. Accordingly, transmission efficiency during data transmission between the plurality of signal processing devices 170 and 170b in the vehicle 200 may be increased.

Meanwhile, the first virtual machine 520 in the signal processing device 170 may check the application list and information through the information manager SWMa and then change the data transmission method based on a classification level of the application within the application. Accordingly, transmission efficiency during data transmission between the plurality of signal processing devices 170 and 170b in the vehicle 200 may be increased.

The operation of the signal processing device 170 or the second signal processing device 170b of FIG. 9 will be described in more detail with reference to FIG. 10 and below.

Figure 10:
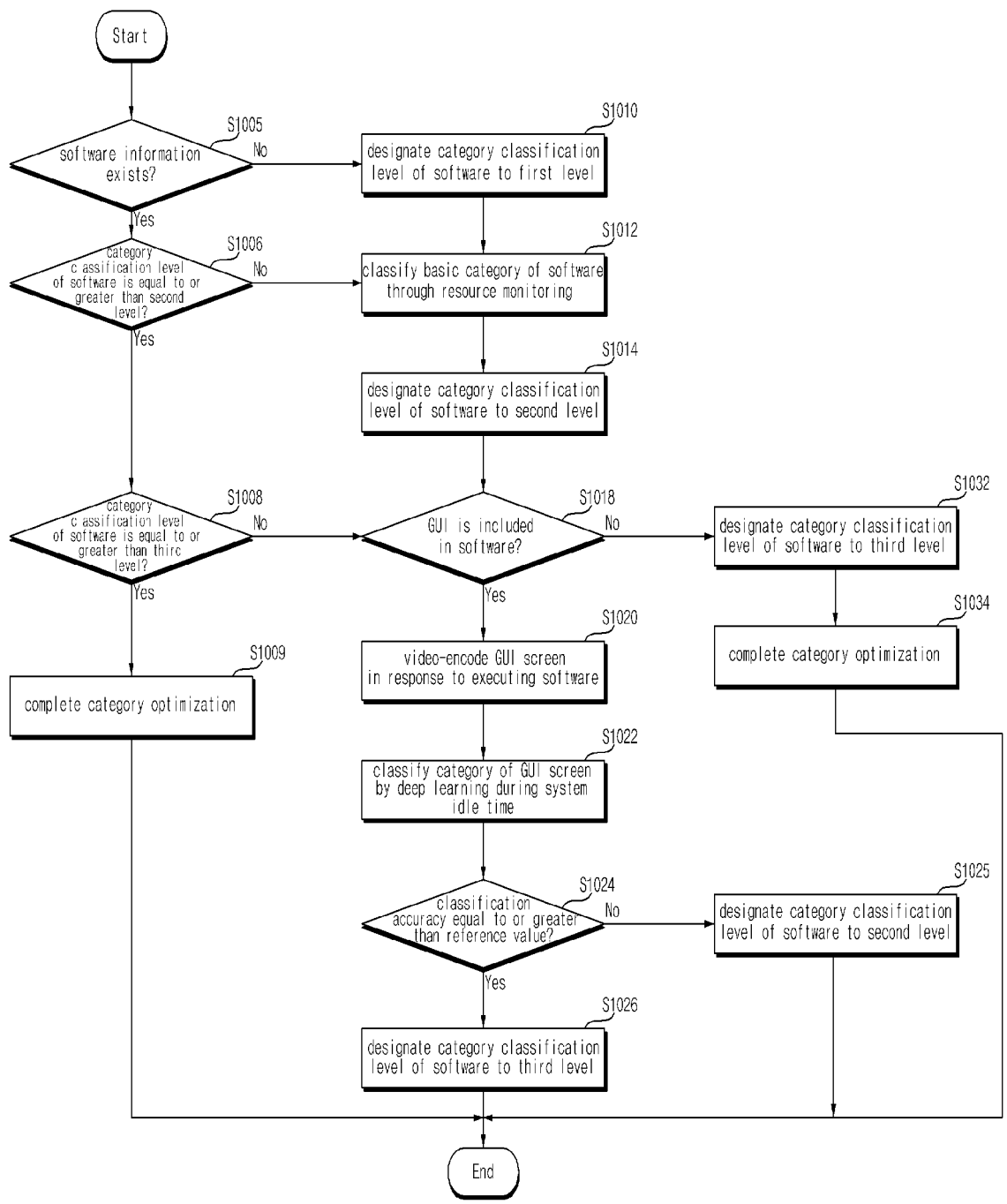

FIG. 10 is a flowchart illustrating a method of classifying software categories based on software use resources.

Referring to the figure, the first virtual machine 520 in the signal processing device 170 determines whether information on software or applications to be transmitted exists (S1005), and when the information exists, the first virtual machine 520 determines whether a category classification level is equal to or greater than a second level (S1006). When the category classification level is equal to or greater than a second level, the first virtual machine 520 determines whether the category classification level is equal to or greater than a third level (S1008). When the category classification level is equal to or greater than a third level, the first virtual machine 520 completes category optimization (S1009).

Meanwhile, when information on software or application does not exist in step 1005 (S1005), the first virtual machine 520 in the signal processing device 170 designates the classification level of software or application as the first level. (S1010).

Meanwhile, when the category classification level is less than the second level in step 1006 (S1006), the first virtual machine 520 in the signal processing device 170 classifies the category of the software or application through resource monitoring (S1012).).

Next, after step 1012 (S1012), the first virtual machine 520 in the signal processing device 170 designates a classification level of software or an application to be transmitted as a second level (S1014).

Meanwhile, when the category classification level is less than the third level in step 1008 (S1008), the first virtual machine 520 in the signal processing device 170 determines whether the software or application includes a graphic image (GUI) (S1018), and if the software or application includes a graphic image (GUI), the first virtual machine 520 encodes the graphic image of the corresponding software or application (S1020).

Next, the first virtual machine 520 in the signal processing device 170 classifies a category of the graphic image using learning during system idle time (S1022).

Next, the first virtual machine 520 in the signal processing device 170 determines whether a classification accuracy is equal to or greater than a reference value (S1024), and designates the classification level of the software or application to be transmitted as a third level if the classification accuracy is equal to or greater than the reference value. (S1026).

Meanwhile, when the software or application does not include a graphic image (GUI) in step 1018 (S1018), the first virtual machine 520 in the signal processing device 170 designates the classification level of the software or application to the third level (S1032). Then, the first virtual machine 520 completes category optimization (S1034).

Meanwhile, when the classification accuracy is less than the reference value in step 1024 (S1024), the first virtual machine 520 in the signal processing device 170 maintains the classification level of the software or application at the second level (S1025).

Accordingly, it is possible to simply and accurately categorize software or applications.

Meanwhile, the first level described in FIG. 10 may indicate level 0, the second level may indicate level 1, and the third level may indicate level 2.

Here, the first level, level 0, represents software or an application that has not been classified at all, the second level, level 1, represents software or an application that has been primarily classified based on resources used during execution, and the third level, level 2, may represent software or an application capable of optimizing data transmission based on detailed pattern identification when there is a classifiable detailed pattern.

Meanwhile, the software or application of the third level, level 2, may be able to optimize data transmission based on a situation at the time of execution.

Figure 11:
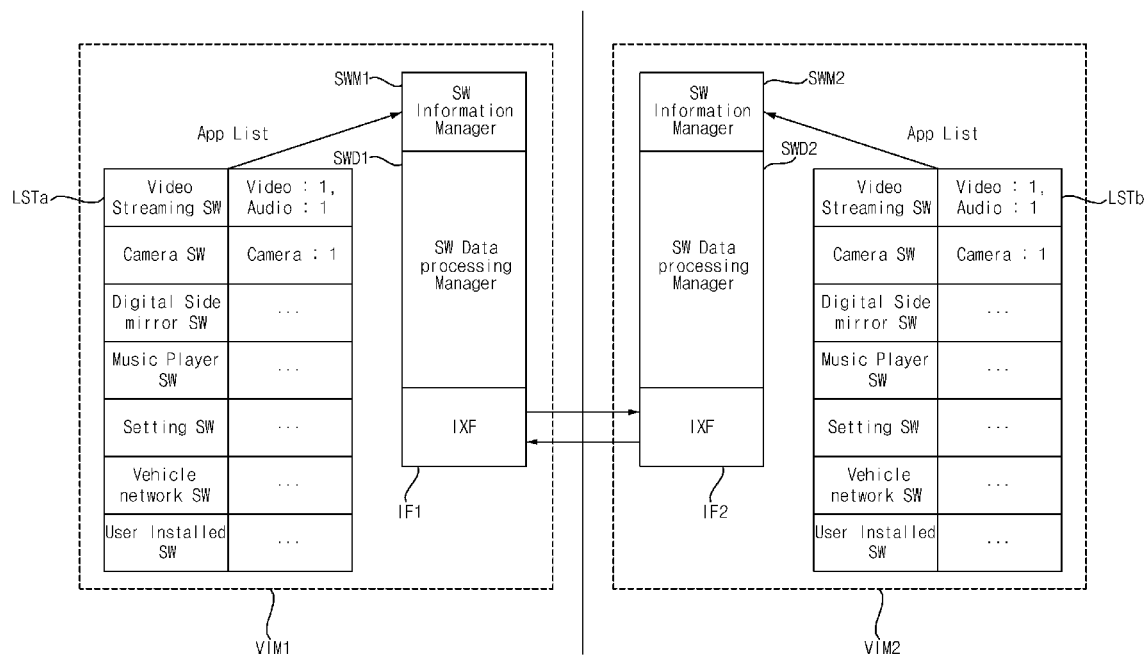

FIG. 11 is a diagram illustrating transmission of application screen data according to a transmission optimization level after checking an application list and information through an information manager.

Referring to the figure, a virtual machine VIM1 on the left may be driven in the signal processing device 170, and a virtual machine VIM2 on the right may be driven in the second signal processing device 170b.

An application list LSTa in the signal processing device 170 may include sequentially, from top to bottom, a video streaming application, a camera application, a digital side mirror application, a music player application, a setting application, a vehicle network application line, and a newly installed application.

In the figure, a video category level of a video streaming application in the application list LSTa is 1, which indicates the second level, and an audio category level is 1, which indicates the second level.

Meanwhile, a camera category level of the camera application in the application list LSTa is 1, which indicates the second level.

The information manager SWM1 in the signal processing device 170 may check the application list LSTa and information, and then transmit application screen data according to the transmission optimization level.

For example, in response to transmitting video streaming application data, the information manager SWM1 in the signal processing device 170 may transmit video data based on the second level and transmit audio data based on the second level.

As another example, in response to transmitting camera application data, the information manager SWM1 in the signal processing device 170 may transmit camera data according to a transmission method based on the second level.

In response thereto, the interface IF2 in the second signal processing device 170b may receive data from the interface IF1 in the signal processing device 170.

For example, when receiving a video streaming application data, the interface IF2 in the second signal processing device 170b may receive video data based on the second level and receive audio data according to a transmission method based on the second level.

As another example, when receiving camera application data, the interface IF2 in the second signal processing device 170b may receive camera data according to the transmission method based on the second level.

Meanwhile, unlike the figure, a video data level, etc. may be classified as 0 or 2, a first level or a third level, and may be transmitted according to a transmission method thereof.

FIGS. 12 to 15B are views referred to in the description of a case of transmitting application data including video data.

Figure 12:
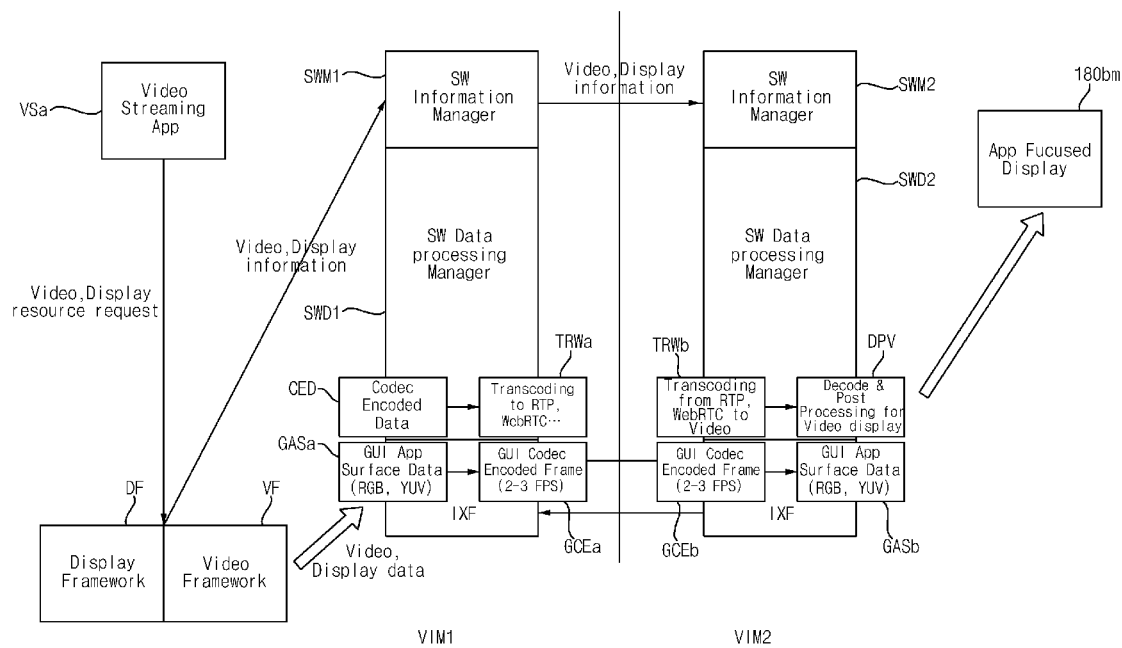

First, referring to FIG. 12, the virtual machine VIM1 on the left may be driven in the signal processing device 170, and the virtual machine VIM2 on the right may be driven in the second signal processing device 170b.

Meanwhile, in response to transmitting application data including video data and a graphic image, the signal processing device 170 may transcode and transmit encoded video data, and encode and transmit the graphic image. In particular, by transcoding and transmitting the video data without decoding, transmission efficiency during data transmission between the plurality of signal processing devices 170 and 170b in the vehicle 200 may be increased.

Meanwhile, the second signal processing device 170b may control to transcode and decode the video data received from the signal processing device 170, decode the graphic image, synthesize the decoded video data and the decoded graphic image, and display a synthesized image. Accordingly, transmission efficiency during data transmission between the plurality of signal processing devices 170 and 170b in the vehicle 200 may be increased.

Figure 13:
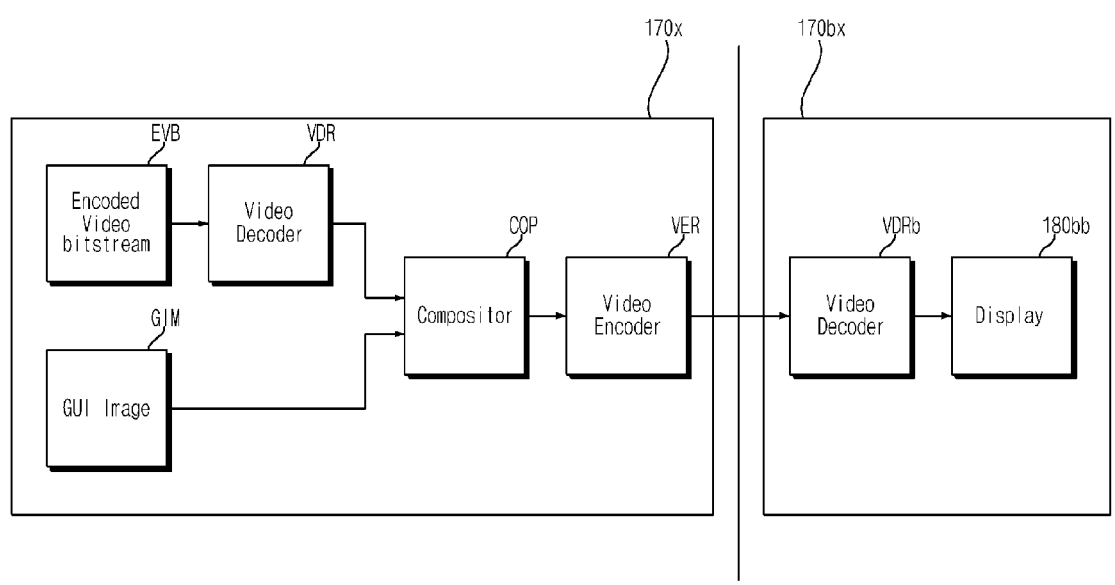

FIG. 13 illustrates internal block diagrams of a signal processing device 170x and a second signal processing device 170bx related to the present disclosure for transmitting video data.

Referring to the figure, the signal processing device 170x decodes an encoded video bitstream EVB in a video decoder VDR, synthesizes decoded video data and graphic image data GIM in a synthesizer COP, encodes synthesized data in the encoder VER, and transmits the encoded data.

In response thereto, the second signal processing device 170bx controls to decode the received data by the video decoder VDRb and output the decoded video data to the display 180bb. A display 180bb here may be an RSE display, the third display 180c.

As such, according to the method of FIG. 13, by decoding and transmitting the encoded video bitstream EVB in the video decoder VDR, a processor usage rate may be to 30% on average. In particular, the processor usage rate may be about 10 to 15% during video encoding, and the processor usage rate may be about 10 to 15% during video decoding.

Also, according to the method of FIG. 13, a memory usage rate may be 213 MB on average, a maximum number of reference frames required for video decoding based on YUV, FHD, and H264 may be 7, and the average number of reference frames required for video encoding may be 2.

Also, according to the method of FIG. 13, data transmission efficiency may be 18 Mbps on average.

Figure 14:
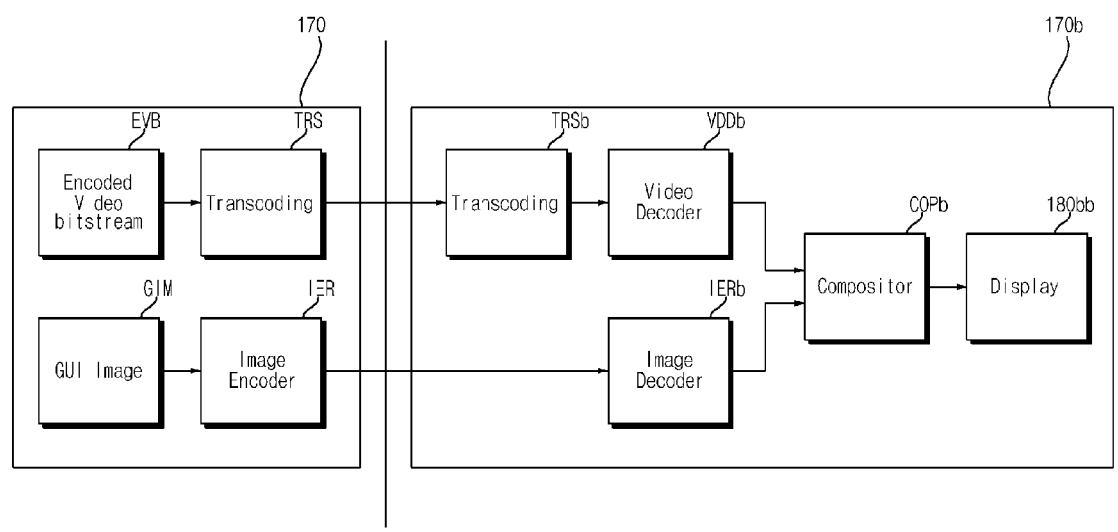

FIG. 14 illustrates internal block diagrams of the signal processing device 170 and the second signal processing device 170b according to an embodiment of the present disclosure for transmitting video data.

Referring to the figure, the signal processing device 170 may transcode and transmit an encoded video bitstream EVB in a transcoder TRS without decoding, and encode graphic image data GIM in an image encoder IER and transmit the same.

In response thereto, the second signal processing device 170b transcodes the received video data in the transcoder TRS, decodes the data in the video decoder VDDb, decodes received graphic image data in an image decoder IERb, synthesizes the decoded video data and the graphic image data in a synthesizer COPb, and controls the display 180bb to output an image including the synthesized video data and graphic image data. The display 180bb here may be an RSE display which is the third display 180c.

As such, according to the method of FIG. 14, by transmitting the encoded video data in the signal processing device 170 through transcoding without decoding, transmission efficiency of data transmission may be increased.

In particular, according to the method of FIG. 14, the average processor usage rate is 18 to 20%, which is significantly improved by the method of FIG. 13.

Also, according to the method of FIG. 14, the memory usage rate is 9 MB on average, which is significantly improved compared to the method of FIG. 13, and the data transfer efficiency is significantly improved to an average of 26 Mbps.

In particular, when video data is FHD 30 fps, H264 compression efficiency based on H264 standard is 20%, 920*1080*30*12*0.2/8 is approximately 17.8 Mbps, and when the graphic image data is FHD and ARGB8888, JPEG compression efficiency based on JEPG standard is approximately 30%, and 1920*1080*3*32*0.3/8 may be 8.1 Mbps.

Figure 15A:
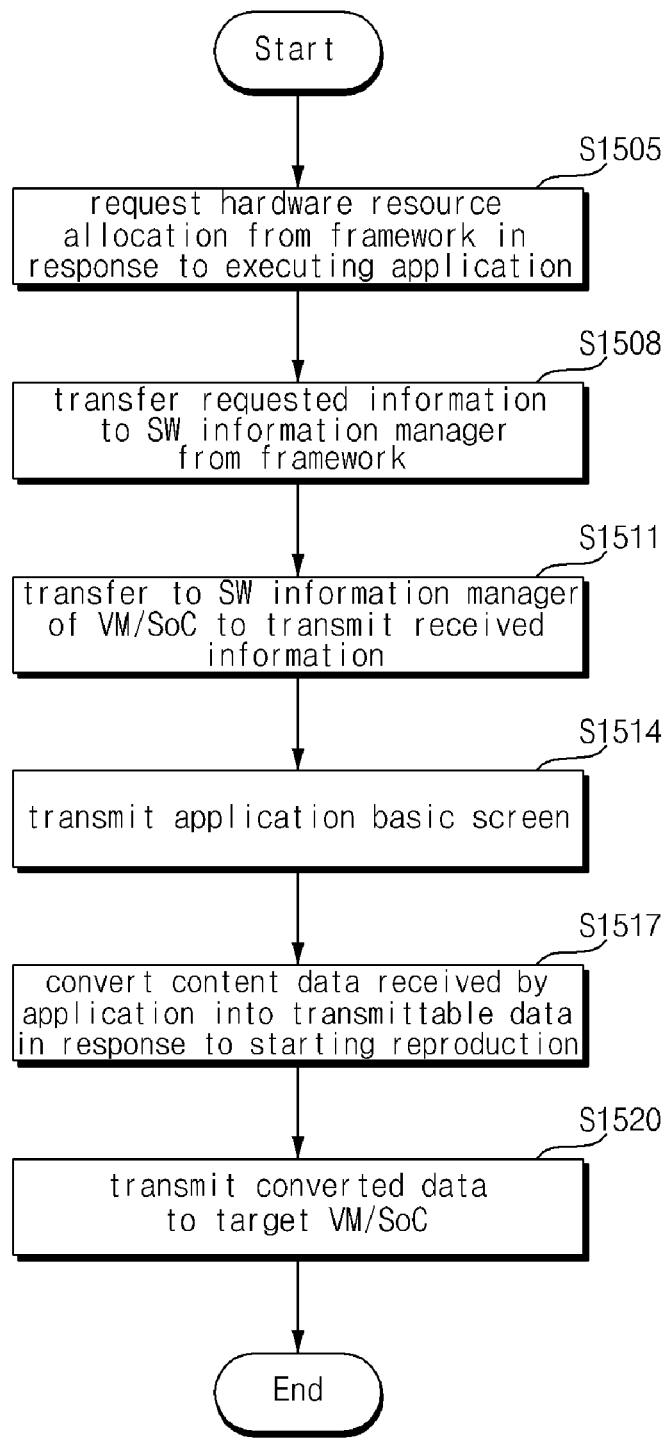

FIG. 15A is a flowchart illustrating an operating method of the signal processing device 170 related to FIGS. 12 and 14.

Referring to the figure, the signal processing device 170 requests hardware support allocation from frameworks DF and VF when a video streaming application VSa is executed (S1505).

Next, the frameworks DF and VF in the signal processing device 170 transfer the requested information to the information manager SWM1 (S1508).

Next, the information manager SWM1 in the signal processing device 170 transfers hardware information (video information, display information) to the information manager SWM2 in the second signal processing device 170b to receive data (S1511).

Next, the interface IF1 in the signal processing device 170 transmits an application basic screen until video streaming is reproduced (S1514).

Next, the data processing manager SWD1 in the signal processing device 170 converts content data received by the application into transmittable data when video streaming starts playing (S1517).

In this case, when the content data includes video data and graphic images, the data processing manager SWD1 in the signal processing device 170 may transcode the encoded video data and encode the graphic image.

Then, the interface IF1 in the signal processing device 170 transmits the converted content data to the interface IF2 of the second signal processing device 170b (S1520).

For example, the interface IF1 in the signal processing device 170 may transmit the transcoded video data and the encoded graphic image data.

Figure 15B:
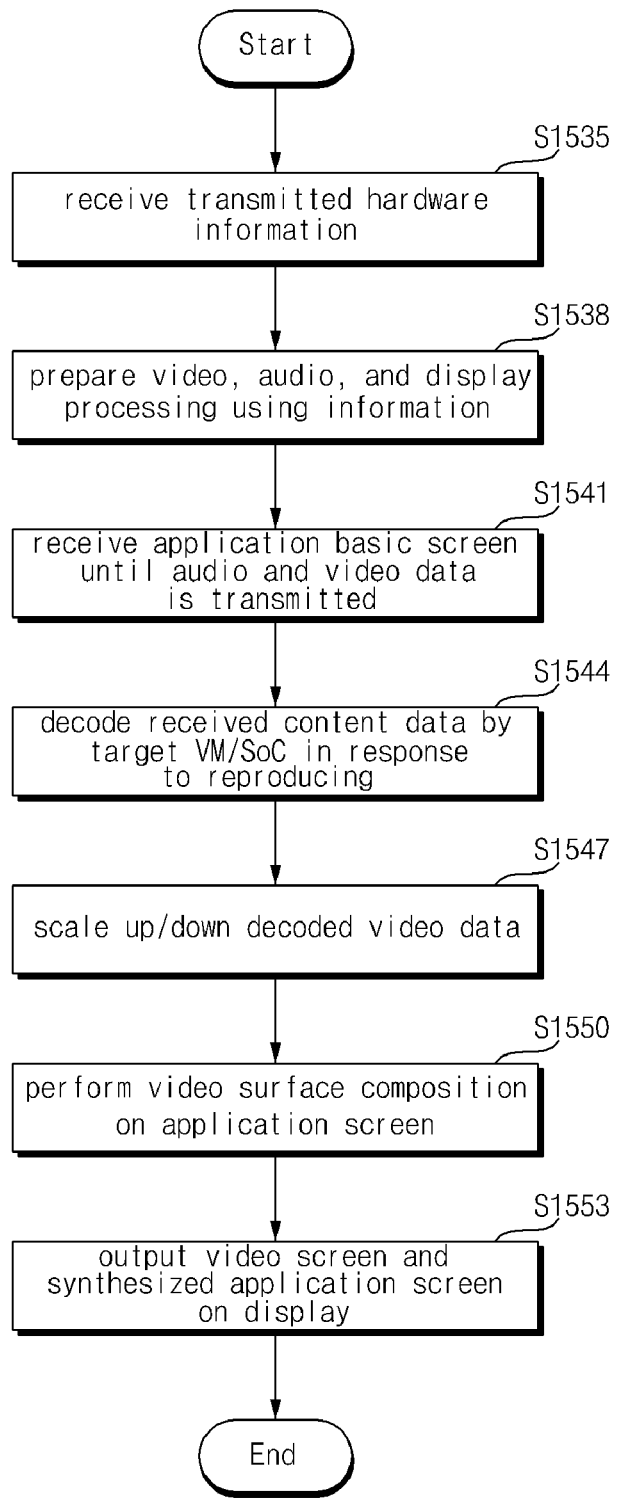

FIG. 15B is a flowchart illustrating an operating method of the second signal processing device 170b related to FIGS. 12 and 14.

Referring to the figure, in response to step 1511 (S1511) of FIG. 15A, the information manager SWM2 in the second signal processing device 170b receives hardware information (video information, display information) (S1535).

Next, the second signal processing device 170*b* prepares video processing, audio processing, and display processing using the received hardware information (S1538).

Next, in response to step 1514 (S1514) of FIG. 15A, the interface IF2 in the second signal processing device 170*b* receives the application basic screen until video streaming is reproduced (S1541).

Next, in response to step 1520 (S1520) of FIG. 15A, the interface IF2 in the second signal processing device 170*b* decodes the received content data (S1544).

For example, the transcoder TRSb in the second signal processing device 170*b* transcodes the video data, the video decoder VDDb decodes the video data, and the image decoder IERb decodes the graphic image data.

Next, the second signal processing device 170*b* scales down or scales up the decoded video data (S1547).

Next, the second signal processing device 170*b* performs video surface composition on the application screen (S1550).

For example, the second signal processing device 170*b* may perform video surface composition using previously received video information and display information.

Next, the synthesizer COPb in the second signal processing device 170*b* synthesizes video data and graphic image data, and outputs an image including the synthesized video data and graphic image data to the display 180*bb* (S1553).

Accordingly, an image including synthesized video data and graphic image data may be displayed on the display 180*bb*.

FIGS. 16 to 19B are views referred to in the description of a case of transmitting application data including camera data.

Figure 16:
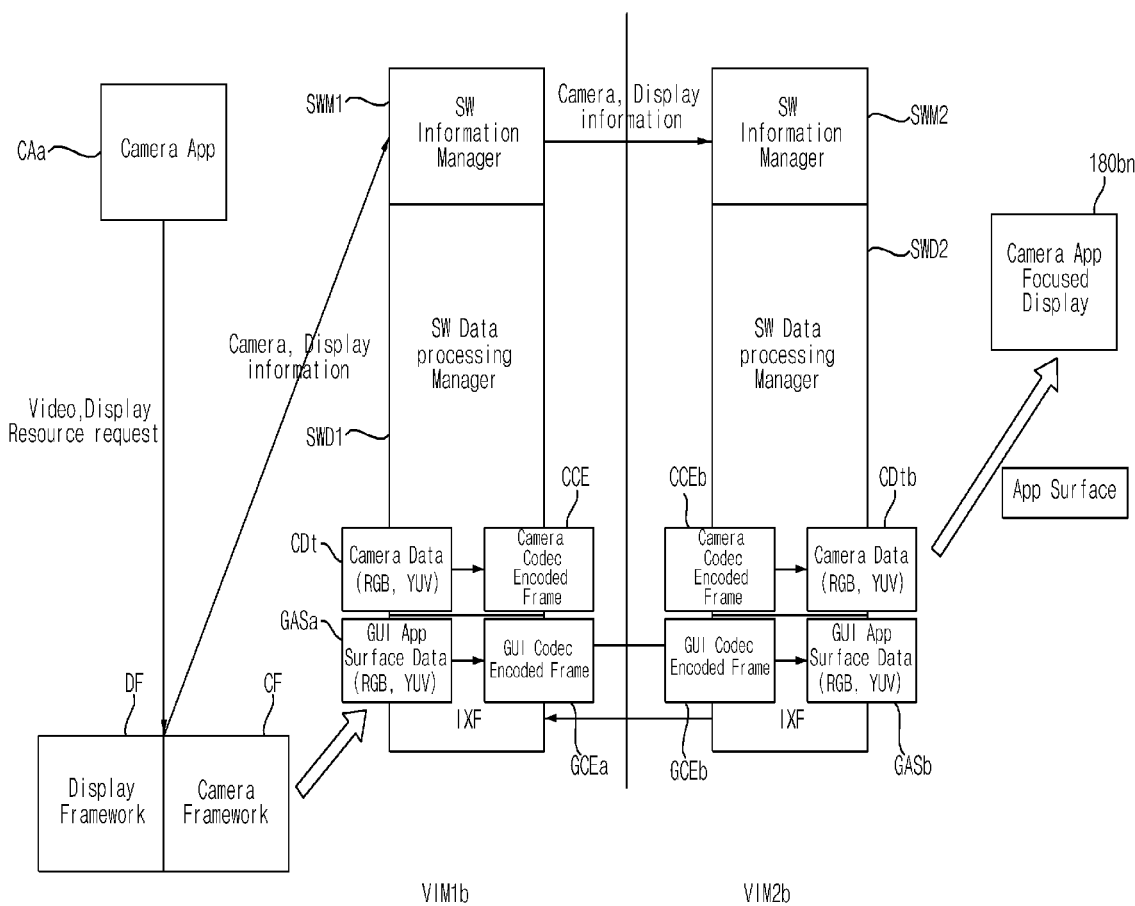

First, referring to FIG. 16, the virtual machine VIM1*b* on the left may be driven in the signal processing device 170, and the virtual machine VIM2*b* on the right may be driven in the second signal processing device 170*b*.

Meanwhile, in response to transmitting application data including camera data and a graphic image, the signal processing device 170 encodes and transmits the graphic image, scales down and transmits the camera data in case in which the camera data is below the reference resolution, and scales down, encodes, and transmits the camera data in case in which the camera data exceeds the reference resolution.

In particular, in order to improve the responsiveness of camera data, in case in which the camera data is below the reference resolution, the camera data is scaled down and immediately transmitted, thereby increasing transmission efficiency during data transmission between the plurality of signal processing devices 170 and 170*b* in the vehicle 200.

Meanwhile, the second signal processing device 170*b* selectively decodes the camera data received from the signal processing device 170, selectively synthesizes the decoded camera data and the decoded graphic image, and controls a synthesized image to be displayed.

Figure 17:
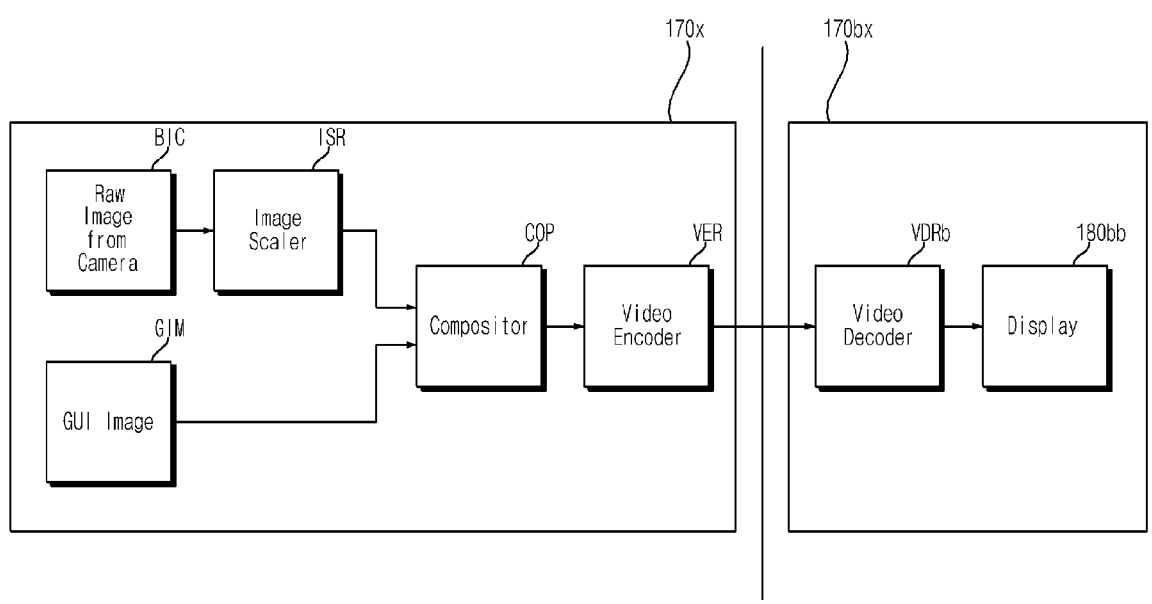

Accordingly, transmission efficiency during data transmission between the plurality of signal processing devices 170 and 170*b* in the vehicle 200 may be increased. FIG. 17 illustrates internal block diagrams of a signal processing device 170*x* and a second signal processing device 170*bx* related to the present disclosure for transmitting camera data.

Referring to the figure, the signal processing device 170*x* receives camera data BIC from a camera, scales down the camera data BIC from the camera through a scaler ISR, synthesizes the scaled-down camera data and the graphic image data GIM in the synthesizer COP, encodes the data in the encoder VER, and then transmits the encoded data.

In response thereto, the second signal processing device 170*bx* decodes the received data in the video decoder VDRb, and controls the display 180*bb* to output the decoded camera data and the graphic image data. The display 180*bb* here may be an RSE display which is the third display 180*c*.

As described above, according to the method of FIG. 17, after scaling down the camera data BIC from the camera through the scaler ISR, the data is encoded and transmitted, and thus, transmission delay occurs and camera responsiveness is reduced.

According to the method of FIG. 17, a processor usage rate may be approximately 10 to 15% when scaling and encoding the camera data.

Also, according to the method of FIG. 17, the memory usage rate may be 5.9 MB on average, and the average number of reference frames required for camera data encoding may be two.

Also, according to the method of FIG. 17, data transmission efficiency may be 18 Mbps on average, and an average data transmission delay of 1 ms per frame occurs due to encoding, decoding, pre-processing, and post-processing time of the camera data.

Figure 18:
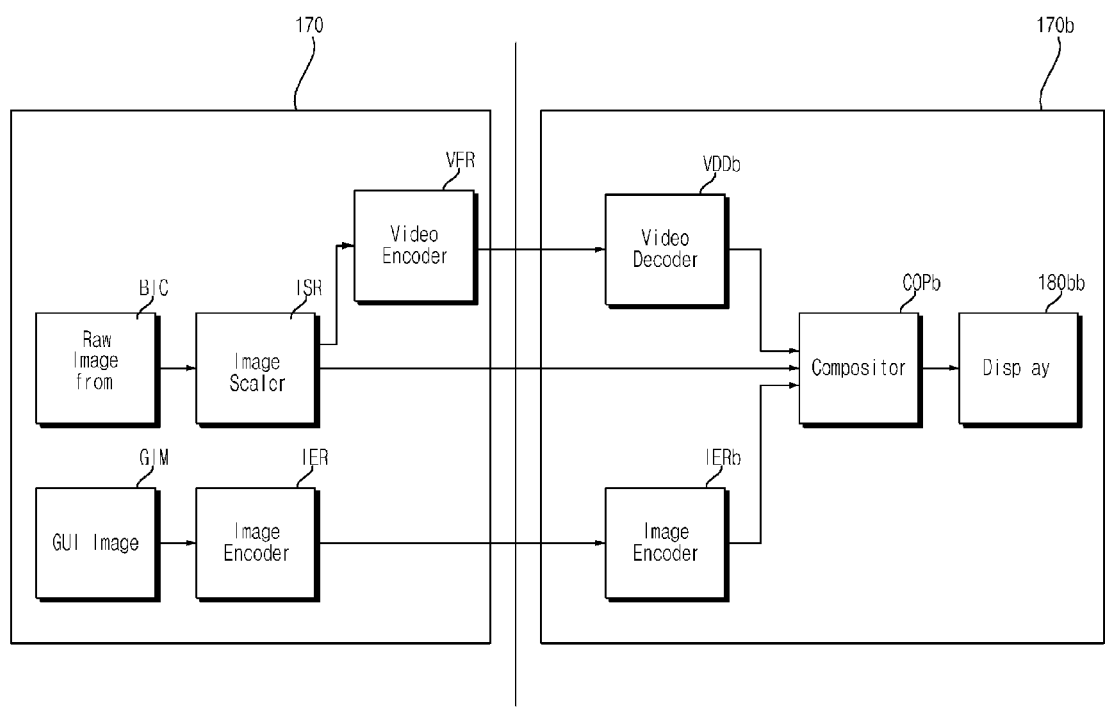

FIG. 18 illustrates internal block diagrams of the signal processing device 170 and the second signal processing device 170*b* according to an embodiment of the present disclosure for transmitting camera data.

Referring to the figure, in case in which the camera data BIC from the camera is less than or equal to a reference resolution, the signal processing device 170 scales down the camera data BIC through the scaler ISR and directly transmits the data, and in case in which the camera data BIC from the camera exceeds the reference resolution, the signal processing device 170 scales down the camera data BIC through the scaler ISR, encodes the data in the video encoder VER, and transmits the same.

Also, the signal processing device 170 may encode the graphic image data GIM in the image encoder IER and transmit the same.

In response thereto, the second signal processing device 170*b* decodes camera data, which exceeds the reference resolution in the received camera data, in the video decoder VDDb, synthesizes the decoded camera data exceeding the reference resolution, the camera data below the reference resolution without separate decoding, and the graphic image data in the synthesizer COPb, and controls the display 180*bb* to display an image including the synthesized camera data and the graphic image data. The display 180*bb* here may be an RSE display which is the third display 180*c*.

As described above, according to the method of FIG. 18, among camera data encoded in the signal processing device 170, camera data having resolution equal to or less than the reference resolution is transmitted as it is without being subjected to separate video encoding, thereby increasing transmission efficiency during data transmission.

Meanwhile, since the amount of changed data in the graphic image data is less than that of camera data, periodic capture and data transmission based on application events may also be made.

In particular, according to the method of FIG. 18, the average processor usage rate is 4 to 8%, which is significantly improved, compared to the method of FIG. 17.

Also, according to the method of FIG. 18, the average memory usage rate is 3 MB, which is significantly improved compared to the method of FIG. 17, and the data transfer efficiency is 41 Mbps on average, which is significantly improved.

In particular, in case in which the camera data is HD YUV 30 fps, 1280*720*30*12/8 is approximately 39.5 Mbps, and when the graphic image data is FHD, YUV, JPG 2 FPS, the JPEG compression efficiency is approximately 30%, and thus, 1920*1080*2*12*0.3/8 may be 1.8 Mbps.

In addition, since encoding and decoding of camera data are reduced, pre-processing and post-processing times required for processing graphic image data are reduced, so that data transmission delay rarely occurs.

Figure 19A:
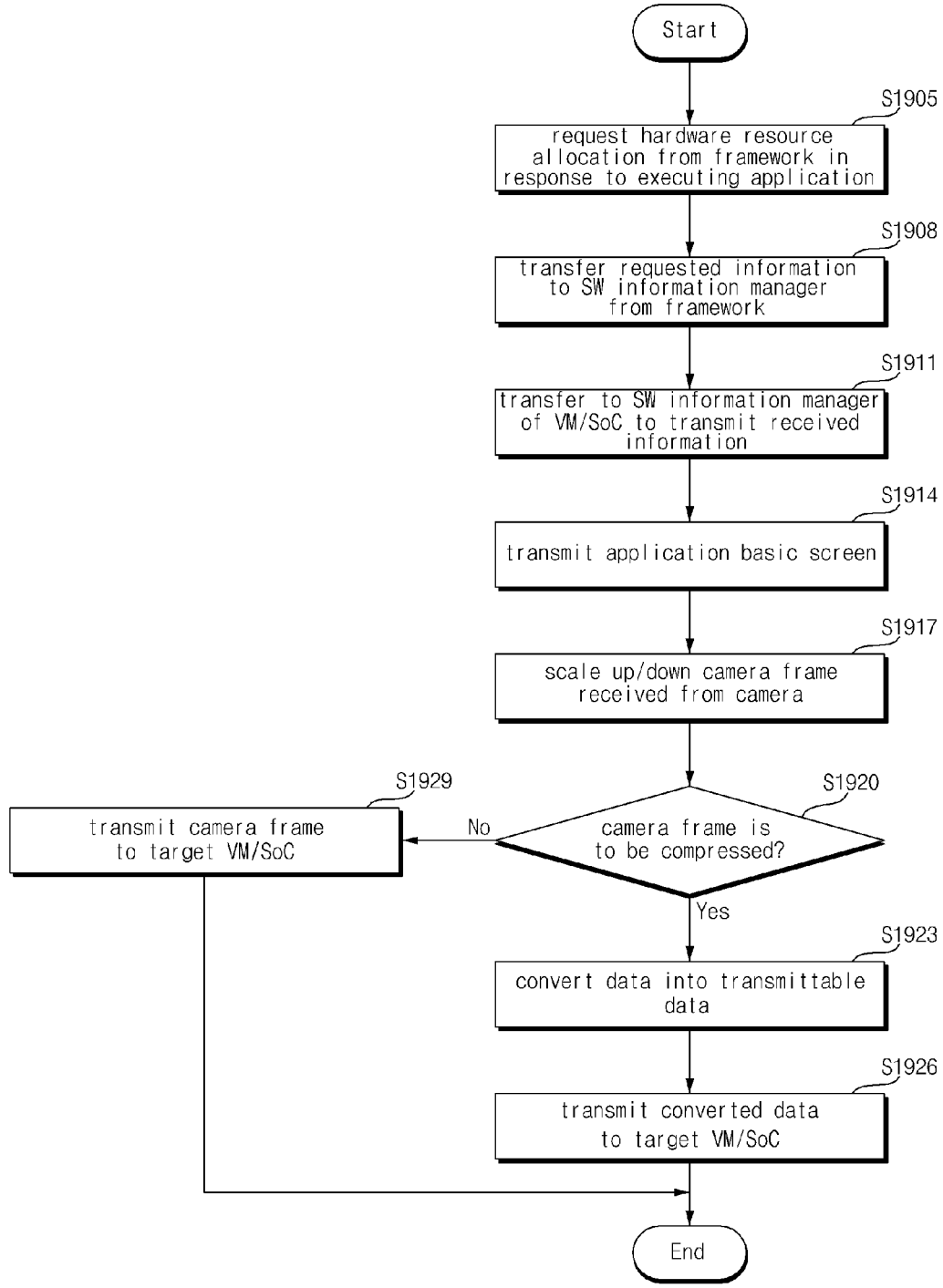

FIG. 19A is a flowchart illustrating an operating method of the signal processing device 170 related to FIGS. 16 and 18.

Referring to the figure, the signal processing device 170 requests hardware support allocation from the frameworks DF and VF in case in which the camera application Ca is executed (S1905).

Next, the frameworks DF and VF in the signal processing device 170 transfer the requested information to the information manager SWM1 (S1908).

Next, the information manager SWM1 in the signal processing device 170 transfers hardware information (camera information, display information) to the information manager SWM2 in the second signal processing device 170b to receive data (S1911).

Next, the interface IF1 in the signal processing device 170 transmits a basic screen of the camera application until camera data is received (S1914).

Next, upon receiving camera data, the data processing manager SWD1 in the signal processing device 170 performs scaling-down or scaling-up through the scaler ISR (S1917).

Next, the signal processing device 170 determines whether camera data needs to be encoded (S1920), and if the camera data needs to be encoded, the signal processing device 170 encodes the camera data through the video encoder VER (S1923).

In particular, in case in which the camera data exceeds the reference resolution, the camera data is encoded through the video encoder VER.

Then, the interface IF1 in the signal processing device 170 transmits the camera data encoded through the video encoder VER to the interface IF2 of the second signal processing device 170b (S1926).

Meanwhile, if the camera data is equal to or less than the reference resolution in step 1920 (S1920), it is not necessary to encode the camera data, so the interface IF1 in the signal processing device 170 transfers the scaled-down camera data to the interface IF2 of the second signal processing device 170b (S1929).

In particular, low-resolution camera data may be transmitted without being encoded, and thus, transmission efficiency during data transmission between the plurality of signal processing devices 170 and 170b in the vehicle 200 may be increased.

Figure 19B:
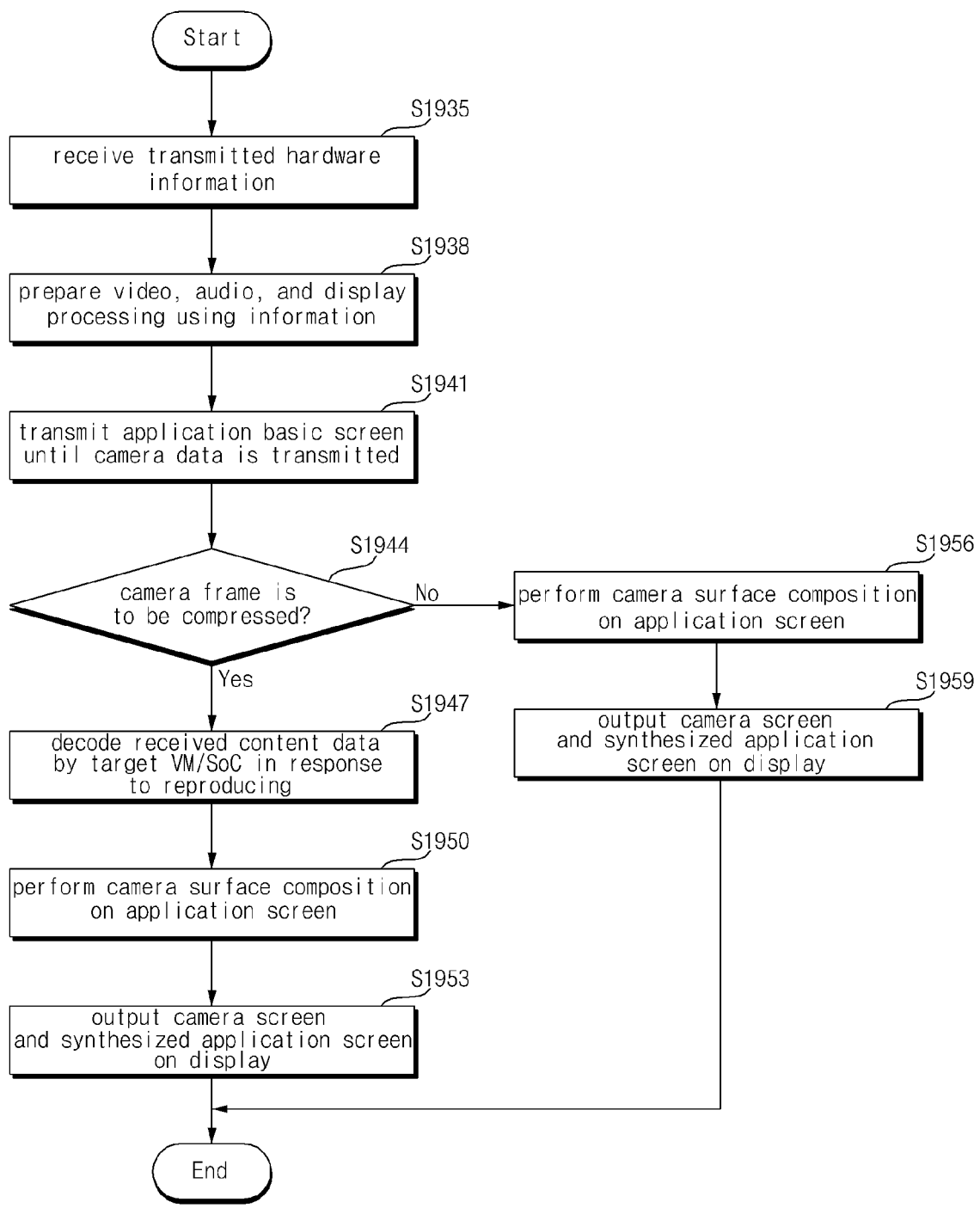

FIG. 19B is a flowchart illustrating an operating method of the second signal processing device 170b related to FIGS. 16 and 18.

Referring to the figure, in response to step 1911 (S1911) of FIG. 19A, the information manager SWM2 in the second signal processing device 170b receives hardware information (camera information, display information) (S1935).

Next, the second signal processing device 170b prepares video processing, audio processing, and display processing using the received hardware information (S1938).

Next, in response to step 1914 (S1914) of FIG. 19A, the interface IF2 in the second signal processing device 170b receives an application basic screen until camera data is received (S1941).

Next, in response to step 1920 (S1920) of FIG. 19A, the second signal processing device 170b determines whether the received camera data needs to be decoded (S1944), and if the received camera data needs to be decoded, the second signal processing device 170b decodes the camera data through the video decoder VDDb (S1947).

In particular, in case in which the camera data exceeds the reference resolution, the camera data is decoded through the video decoder VDDb.

Next, the second signal processing device 170b performs camera surface composition on the application screen (S1950).

For example, the second signal processing device 170b may perform camera surface synthesis using previously received camera information and display information.

Next, the synthesizer COPb in the second signal processing device 170b synthesizes camera data and graphic image data and outputs an image including the synthesized camera data and graphic image data to the display 180bb (S1953).

Accordingly, the image including the synthesized camera data and graphic image data may be displayed on the display 180bb.

Meanwhile, in step 1944 (S1944), if the received camera data has a resolution equal to or less than the reference resolution, it is not necessary to decode the camera data, so the second signal processing device 170b synthesizes the received camera data and graphic image data and outputs an image including the synthesized camera data and graphic image data to the display 180bb (S1959).

Accordingly, the image including the synthesized camera data and graphic image data may be displayed on the display 180bb.

FIGS. 20 to 23B are views referred to in the description of a case of transmitting application data including audio data.

Figure 20:
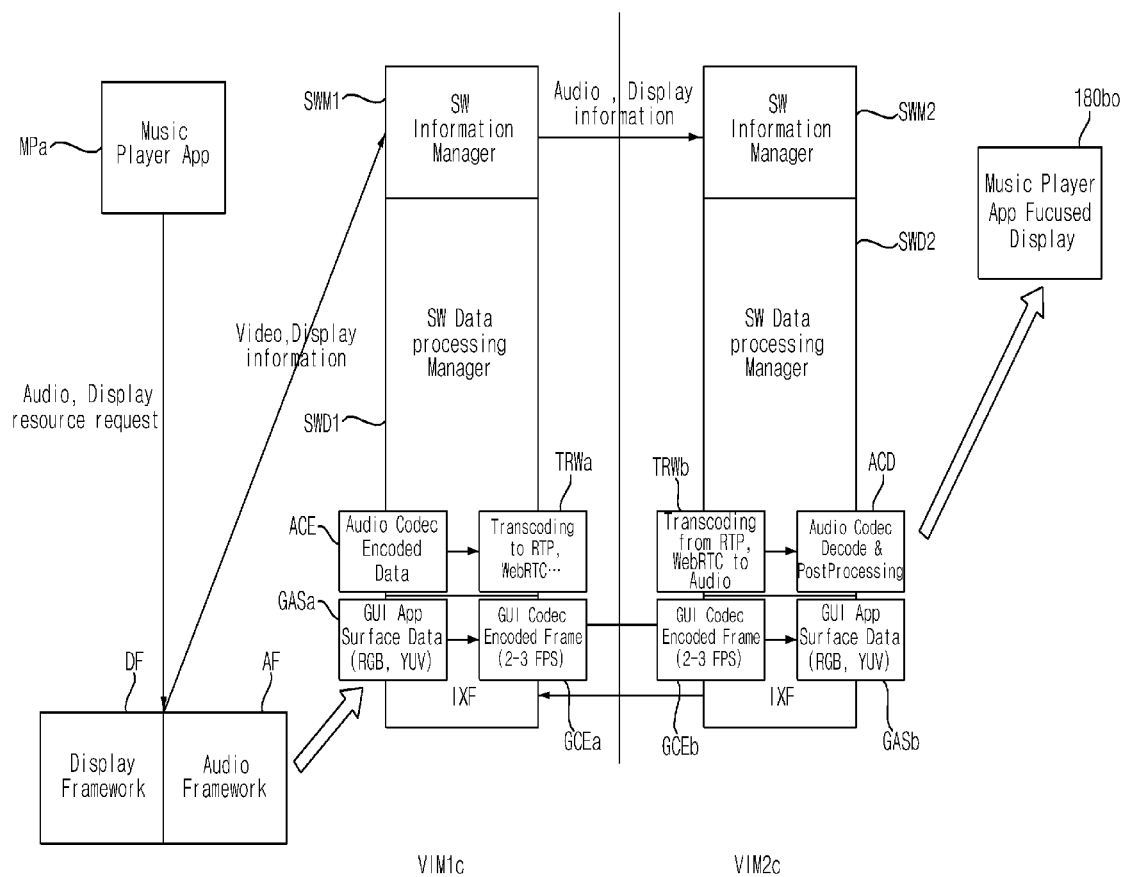

First, referring to FIG. 20, the virtual machine VIM1c on the left may be driven in the signal processing device 170, and the virtual machine VIM2c on the right may be driven in the second signal processing device 170b.

Meanwhile, in response to transmitting application data including audio data and a graphic image, the signal processing device 170 may transcode and transmit encoded audio data and encode and transmit the graphic image. In particular, by transcoding and transmitting the audio data without decoding, transmission efficiency during data transmission between the plurality of signal processing devices 170 and 170b in the vehicle 200 may be increased.

Meanwhile, the second signal processing device 170b may transcode and decode the audio data received from the signal processing device 170, control the decoded audio data to be output, decode the graphic image, and control the decoded graphic image to be displayed. Accordingly, transmission efficiency during data transmission between the plurality of signal processing devices 170 and 170b in the vehicle 200 may be increased.

Figure 21:
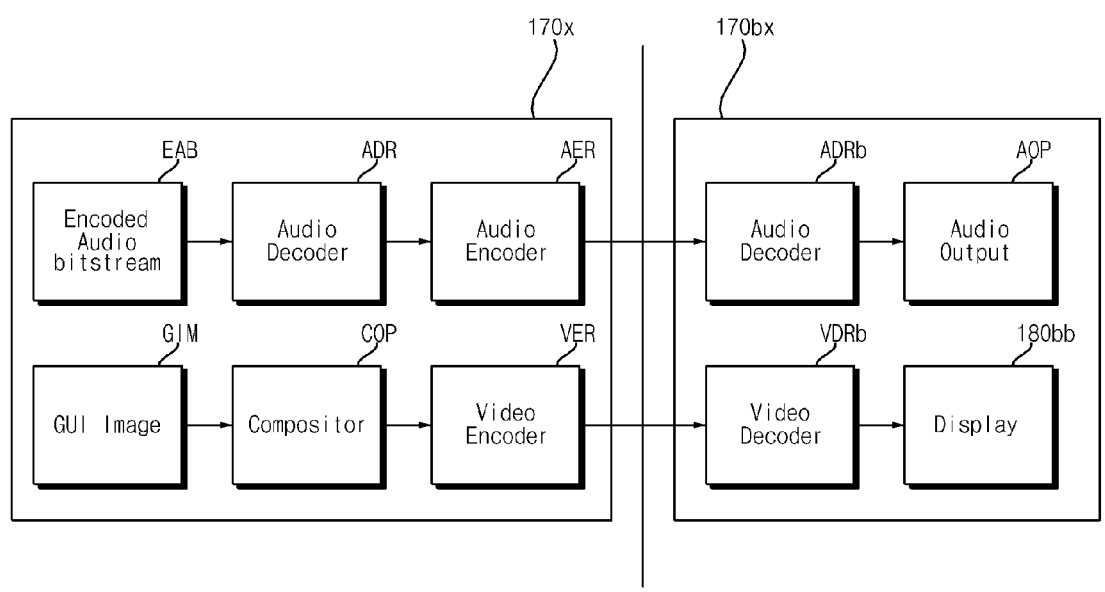

FIG. 21 illustrates an internal block diagram of the signal processing device 170x and the second signal processing device 170bx related to the present disclosure for transmitting audio data.

Referring to the figure, a signal processing device 170x decodes an encoded audio bitstream EAB in an audio decoder ADR, encodes the decoded audio data in an audio encoder AER, and transmits the same.

Meanwhile, the signal processing device 170x synthesizes the graphic image data GIM in the synthesizer COP, encodes the synthesized data in the encoder VER, and transmits the same.

In response thereto, the second signal processing device 170bx decodes the received audio data in the audio decoder ADRb and controls the decoded audio data to be output through the audio output device AOP.

In addition, the second signal processing device 170bx decodes the received graphic data in the decoder VDRb and controls the display 180bb to output the decoded graphic image data. The display 180bb here may be an RSE display which is the third display 180c.

As described above, according to the method of FIG. 21, the encoded audio bitstream EAB is decoded in the audio decoder ADR, and the decoded audio data is encoded in the audio encoder AER and transmitted, so that a processor usage rate may be about 25 to 30% on average. In particular, the processor usage rate may be about 10 to 15% during audio encoding, and the processor usage rate may be about 10 to 15% during audio decoding.

Also, according to the method of FIG. 21, the memory usage rate may be 10 MB on average, and based on PCM 192 KHz and 24 Bit, a memory size required for audio decoding may be 5673 KB, and a memory size required for audio encoding may be 5673 KB.

Also, according to the method of FIG. 21, data transmission efficiency may be 28 Mbps on average.

Figure 22:
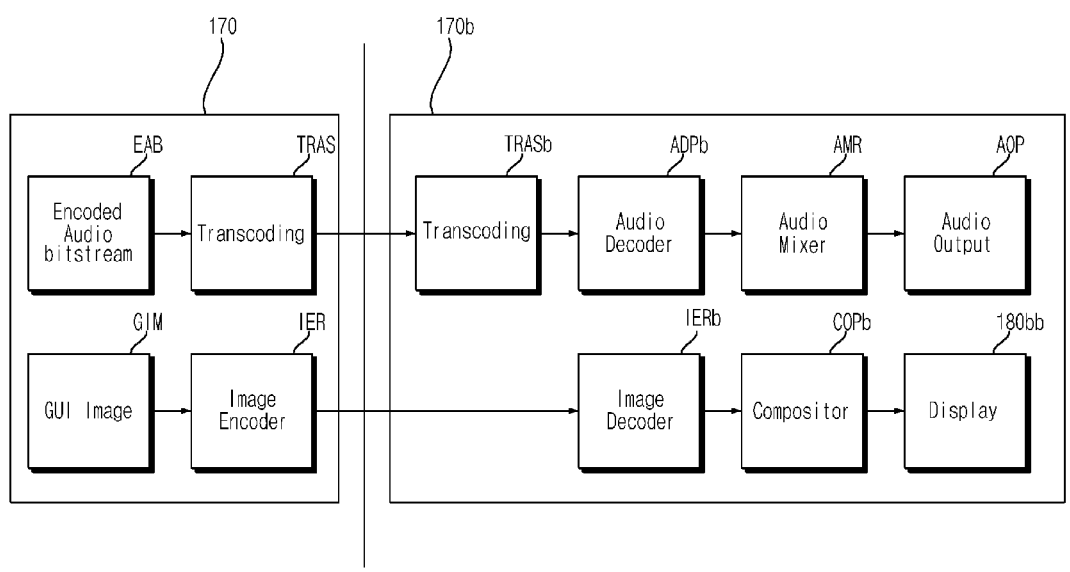

FIG. 22 illustrates an internal block diagram of the signal processing device 170 and the second signal processing device 170b according to an embodiment of the present disclosure for transmitting audio data.

Referring to the figure, the signal processing device 170 may transcode and transmit the encoded audio bitstream EAB in the transcoder TRS without decoding and encoding, and encode and transmit the graphic image data GIM in the image encoder IER.

In response thereto, the second signal processing device 170b transcodes the received audio data in the transcoder TRS, decodes the data in the audio decoder VDDb, mixes the data through the audio mixer AMR, and controls the audio output device AOP to output the mixed audio data.

In addition, the second signal processing device 170b decodes the received graphic data in the image decoder IERb, synthesizes the decoded graphic image data in the synthesizer COPb, and controls the display 180bb to output the synthesized graphic image data 180bb. The display 180bb here may be an RSE display which is the third display 180c.

As such, according to the method of FIG. 22, in response to transmitting the encoded audio data from the signal processing device 170, the encoded audio data is transmitted by transcoding without decoding and encoding, and thus, transmission efficiency during data transmission may be increased.

In particular, according to the method of FIG. 22, the processor usage rate is 18% on average, which is significantly improved compared to the method of FIG. 21.

Also, according to the method of FIG. 22, the memory usage rate is 5 MB on average, which is significantly improved compared to the method of FIG. 21, and an average amount of memory used for audio transcoding is approximately 5 Mbps, and data transfer efficiency is 13 Mbps on average, which is significantly improved.

In particular, when the audio data is a 192 Khz, 24 bit MP3, the average compression rate is 25%, and when the graphic image data is JPG, the average compression rate may be 30%.

Figure 23A:
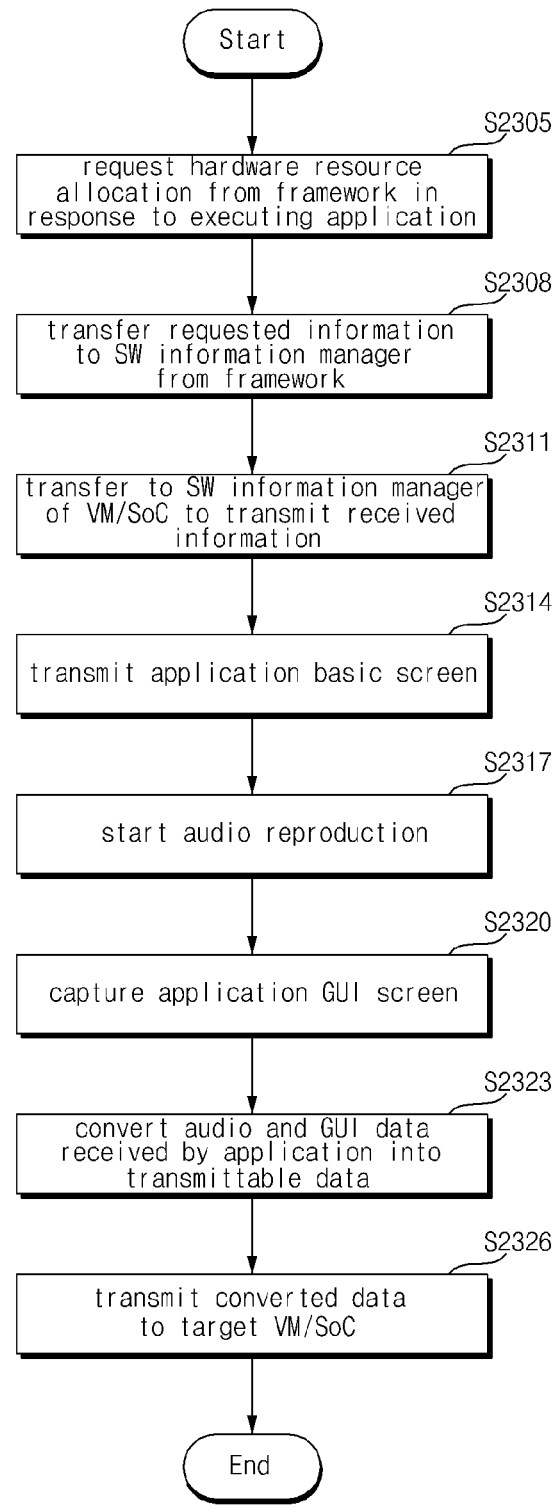

FIG. 23A is a flowchart illustrating an operating method of the signal processing device 170 related to FIGS. 20 and 22.

Referring to the figure, the signal processing device 170 requests hardware support allocation from the frameworks DF and VF when the audio streaming application MPa is executed (S2305).

Next, the frameworks DF and VF in the signal processing device 170 transfer the requested information to the information manager SWM1 (S2308).

Next, the information manager SWM1 in the signal processing device 170 transfers hardware information (audio information, display information) to the information manager SWM2 in the second signal processing device 170b to receive data (S2311).

Next, the interface IF1 in the signal processing device 170 transmits an application basic screen until audio streaming is reproduced (S2314).

Next, when audio streaming starts to be reproduced (S2317), the signal processing device 170 captures the application screen (S2320).

Next, the data processing manager SWD1 in the signal processing device 170 converts the content data received by the application into transmittable data (S2323).

In this case, when the content data includes audio data and a graphic image, the data processing manager SWD1 in the signal processing device 170 may transcode the encoded audio data and encode the graphic image.

Then, the interface IF1 in the signal processing device 170 transmits the converted content data to the interface IF2 of the second signal processing device 170b (S2326).

For example, the interface IF1 in the signal processing device 170 may transmit transcoded audio data and encoded graphic image data.

Figure 23B:
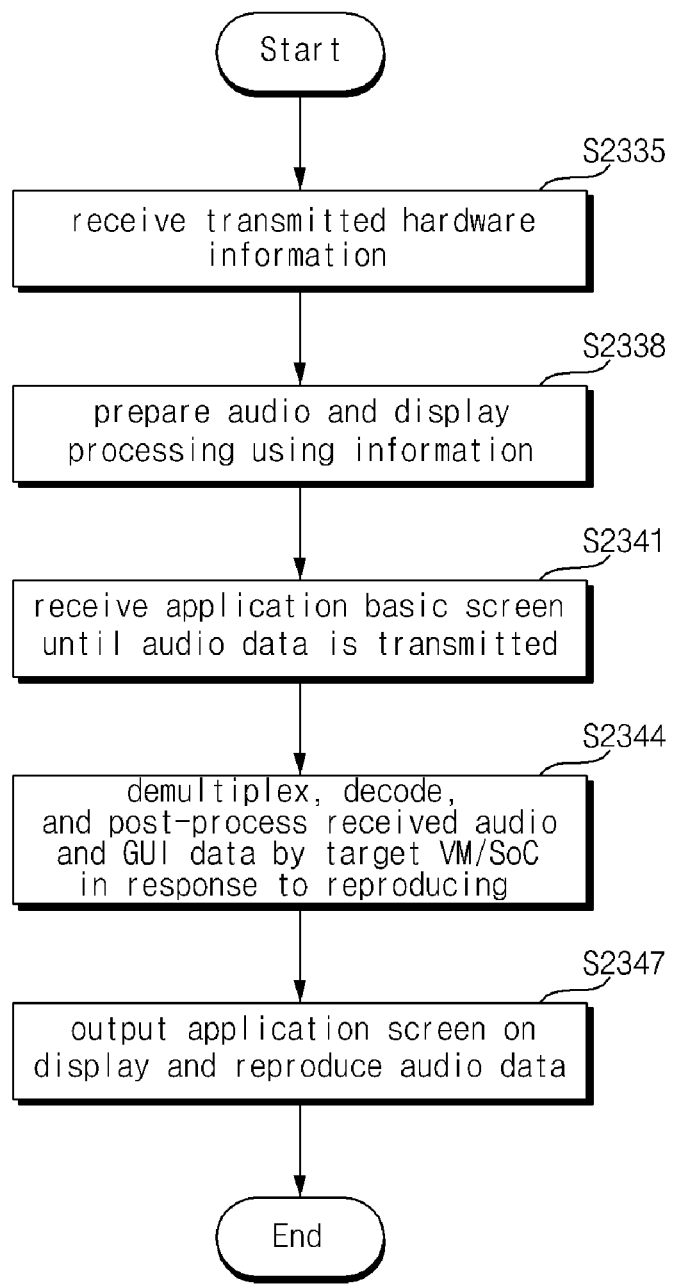

FIG. 23B is a flowchart illustrating an operating method of the second signal processing device 170b related to FIGS. 20 and 22.

Referring to the figure, in response to step 2311 (S2311) of FIG. 23A, the information manager SWM2 in the second signal processing device 170b receives hardware information (audio information, display information) (S2335).

Next, the second signal processing device 170b prepares audio processing, audio processing, and display processing using the received hardware information (S2338).

Next, in response to step 2314 (S2314) of FIG. 23A, the interface IF2 in the second signal processing device 170b receives an application basic screen until audio streaming is reproduced (S2341).

Next, in response to step 2326 (S2326) of FIG. 23A, the interface IF2 in the second signal processing device 170b decodes the received content data (S2344).

For example, a transcoder TRASb in the second signal processing device 170b transcodes audio data, the audio decoder VDDb decodes the audio data, the audio mixer AMR mixes the audio data, and the audio output device AOP outputs audio (S2347).

Meanwhile, the image decoder IERb in the second signal processing device 170b decodes the graphic image data, synthesizes the decoded data through the synthesizer COPb, and outputs the graphic image data to the display 180bb.

Figure 24:
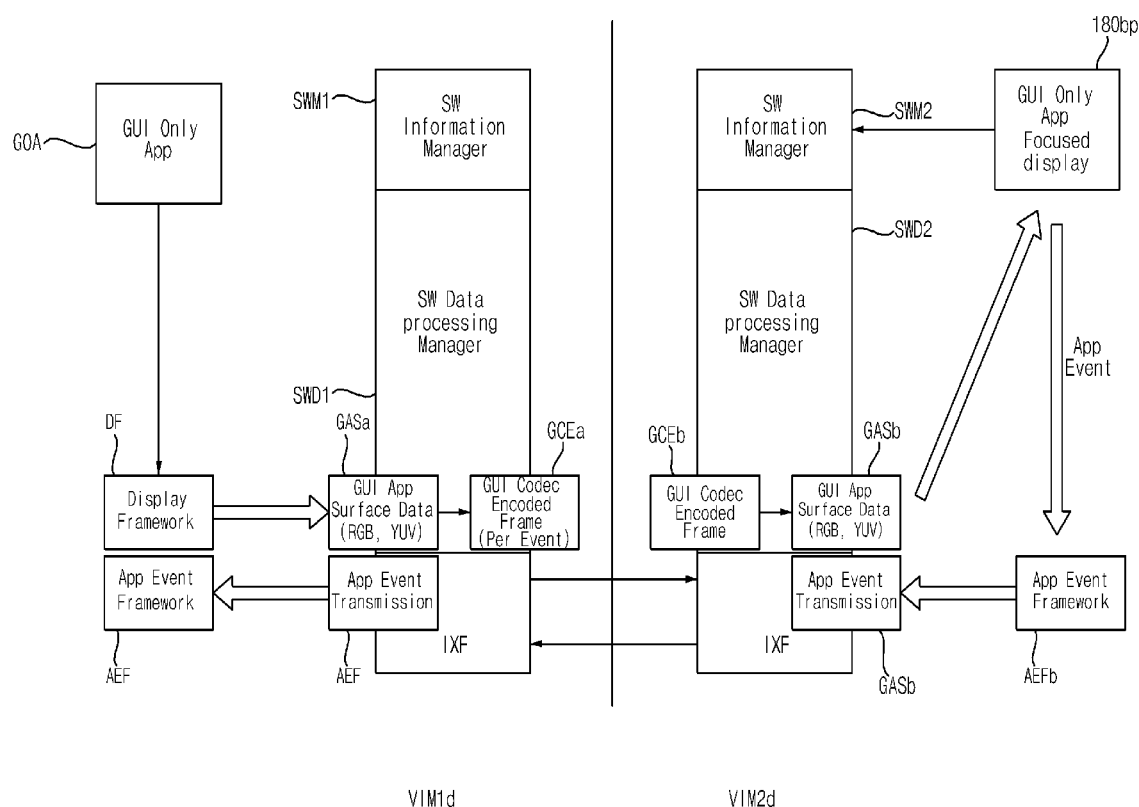
Figure 25A:
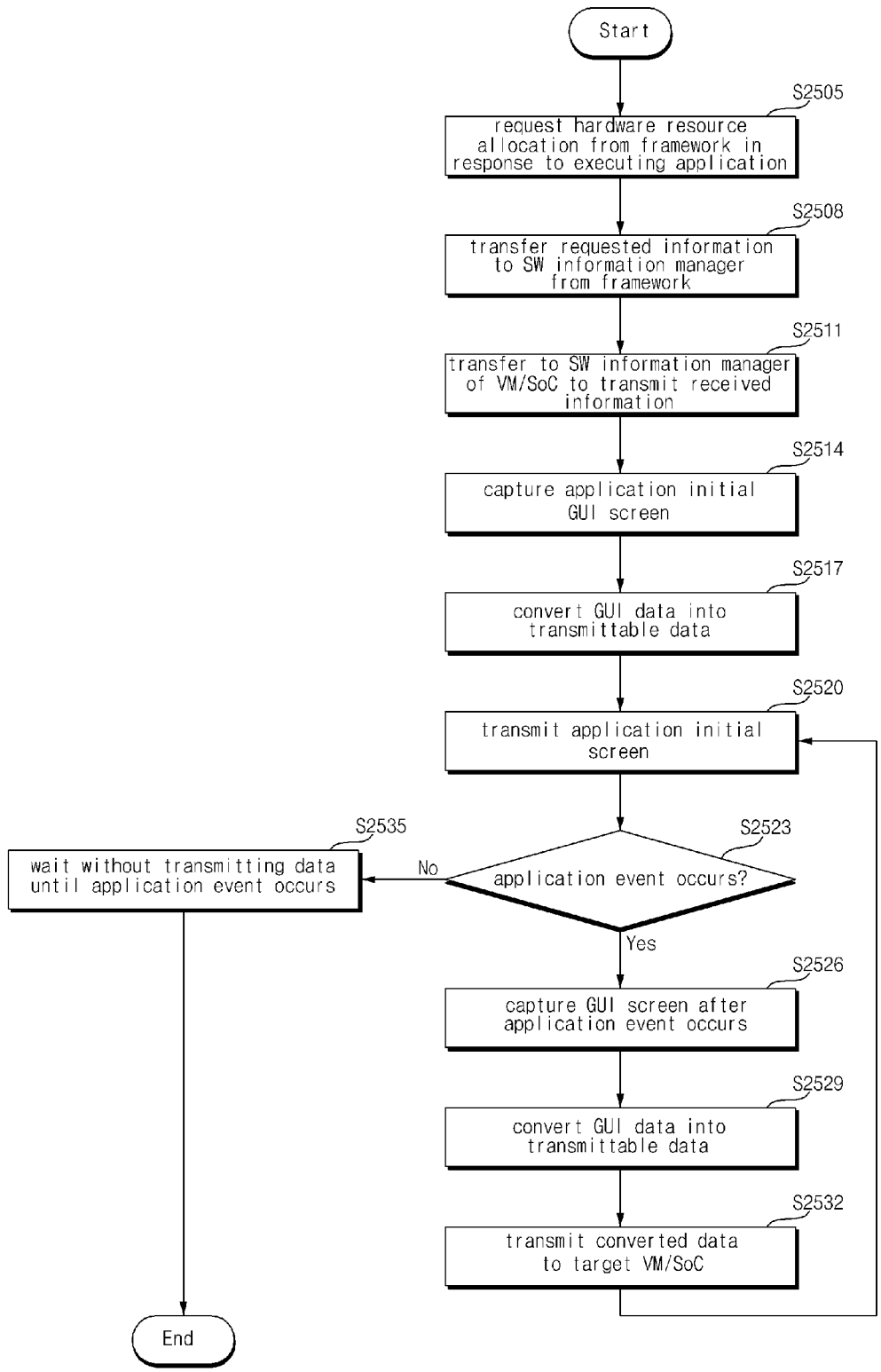
Figure 25B:
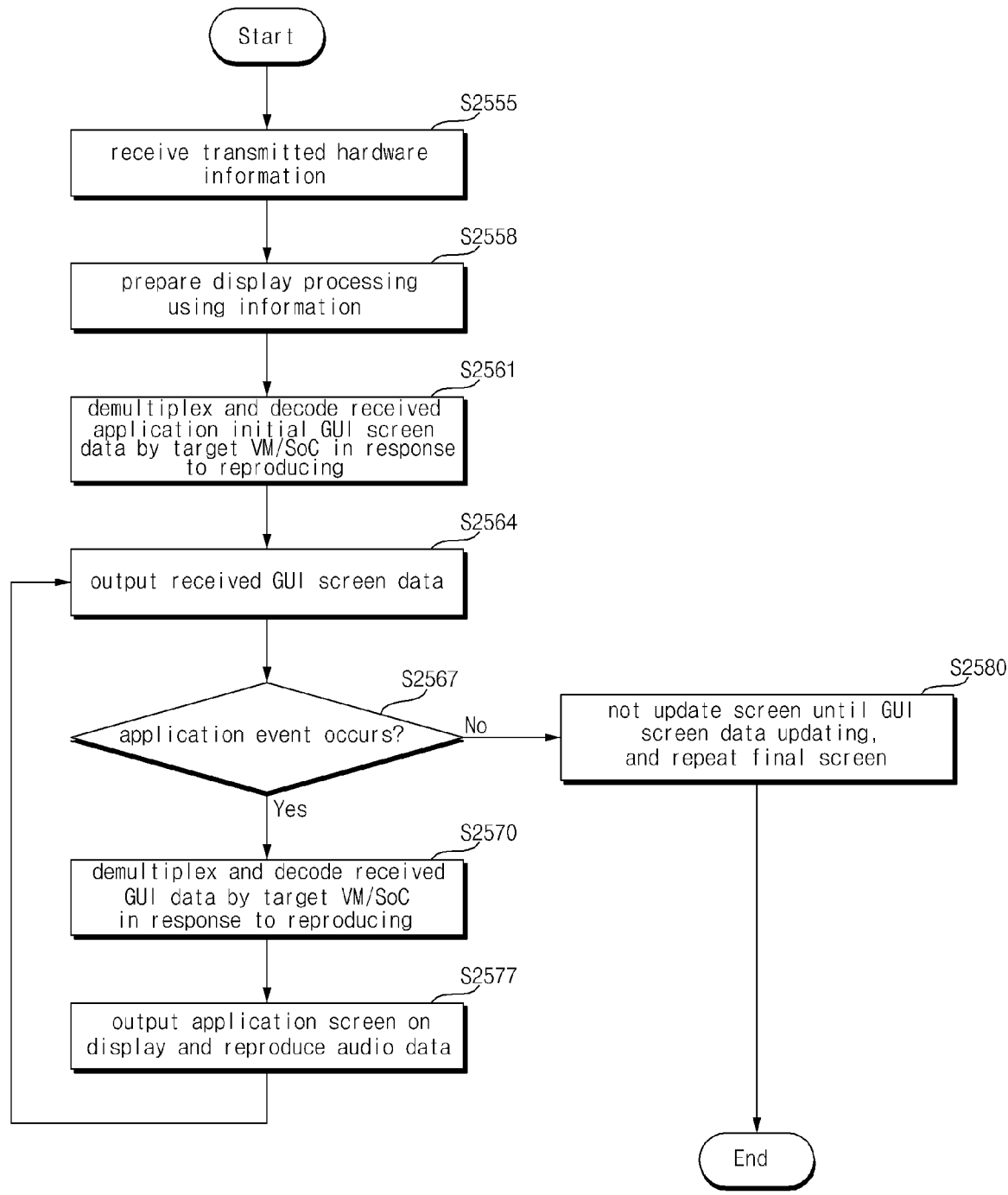

FIGS. 24 to 25B are views referred to in the description of a case of transmitting application data including graphic image data.

First, referring to FIG. 24, the virtual machine VIM1d on the left may be driven in the signal processing device 170, and the virtual machine VIM2d on the right may be driven in the second signal processing device 170b.

Meanwhile, the signal processing device 170 may encode and transmit only the graphic image in response to transmitting application data.

Meanwhile, the second signal processing device 170b may decode the graphic image received from the signal processing device 170 and control the decoded graphic image to be displayed. Accordingly, transmission efficiency during data transmission between the plurality of signal processing devices 170 and 170b in the vehicle 200 may be increased.

FIG. 25A is a flowchart illustrating an operating method of the signal processing device 170 related to FIG. 24.

Referring to the figure, the signal processing device 170 requests hardware support allocation from the frameworks DF and AEF when a graphic application GOa is executed (S2505).

Next, the frameworks DF and AEF in the signal processing device 170 transfer the requested information to the information manager (SWM1) (S2508).

Next, the information manager SWM1 in the signal processing device 170 transfers hardware information to the information manager SWM2 in the second signal processing device 170b to receive data (S2511).

Next, the signal processing device 170 captures a graphic user interface screen at an early stage of the application (S2514).

Next, the data processing manager SWD1 in the signal processing device 170 converts the graphic image data corresponding to the graphic user interface screen at an early stage of the application into transmittable data (S2517).

For example, the data processing manager SWD1 in the signal processing device 170 may encode the graphic image.

Then, the interface IF1 in the signal processing device 170 transmits the graphic image data corresponding to the initial screen to the interface IF2 of the second signal processing device 170b (S2520).

Next, the signal processing device 170 determines whether an application event occurs (S2523), and if an application event does not occur, the signal processing device 170 controls to wait without transmitting data (S2535).

Meanwhile, when an application event occurs, the signal processing device 170 captures a graphic user interface screen after the occurrence of the application event (S2526).

Next, the data processing manager SWD1 in the signal processing device 170 converts the graphic image data corresponding to the graphic user interface screen after the occurrence of the application event into transmittable data (S2529).

Then, the interface IF1 in the signal processing device 170 transmits the graphic image data corresponding to the graphic user interface screen after the occurrence of the event to the interface IF2 of the second signal processing device 170b (S2530).

FIG. 25B is a flowchart illustrating an operating method of the second signal processing device 170b related to FIG. 24.

Referring to the figure, in response to step 2511 (S2511) of FIG. 25A, the information manager SWM2 in the second signal processing device 170b receives hardware information (S2555).

Next, the second signal processing device 170b prepares display processing using the received hardware information (S2558).

Next, in response to step 2520 (S2520) of FIG. 25A, the interface IF2 in the second signal processing device 170b receives an application basic screen, and the second signal processing device 170b decodes the received content data (S2561).

For example, the image decoder IERb in the second signal processing device 170b decodes the graphic image data.

Next, the second signal processing device 170b outputs an image including the graphic image data to the display 180bb (S2564).

Next, in response to step 2523 (S2523) of FIG. 25A, it is determined whether an application event occurs (S2567), and if an application event does not occur, the second signal processing device 170b does not update the screen and controls a final screen to be repeatedly displayed (S2580).

Meanwhile, when an application event occurs, the second signal processing device 170b receives a graphic user interface screen after the occurrence of the application event, and the second signal processing device 170b decodes the received content data (S2570).

Then, the second signal processing device 170b outputs an image corresponding to the graphic user interface screen after the occurrence of the application event to the display 180bb (S2577).

Accordingly, a screen including only the graphic image before and after the occurrence of an event may be quickly transmitted to be displayed.

Figure 26:
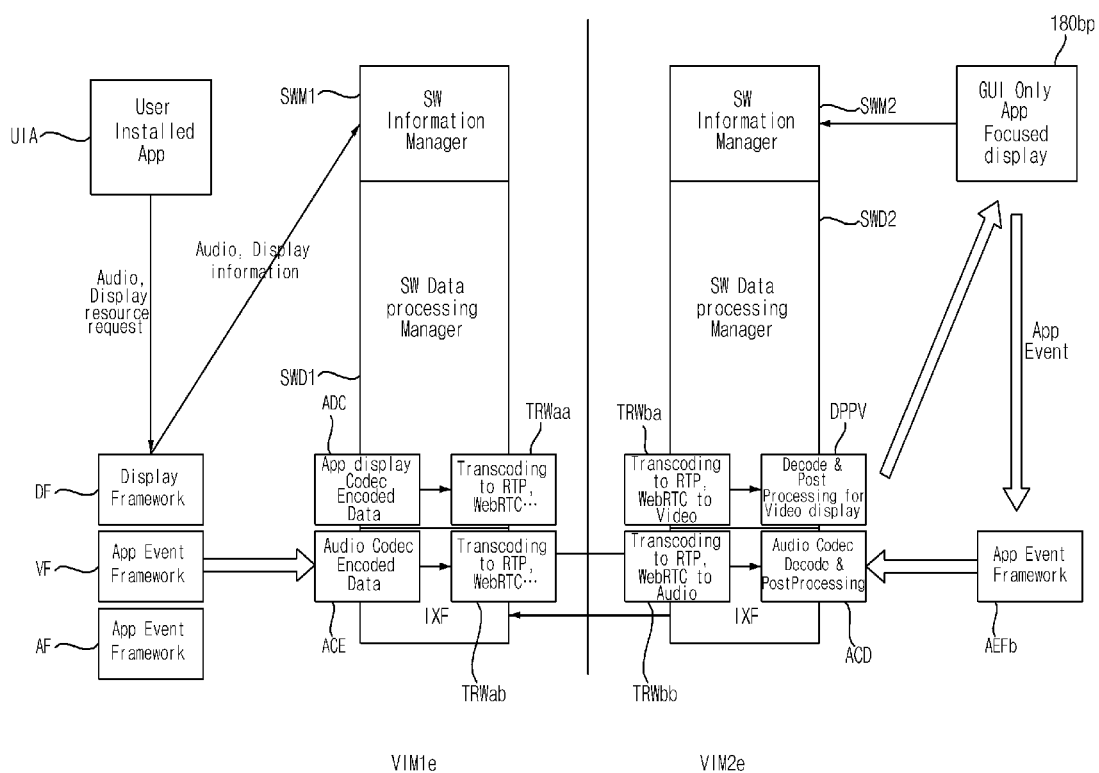
Figure 27A:
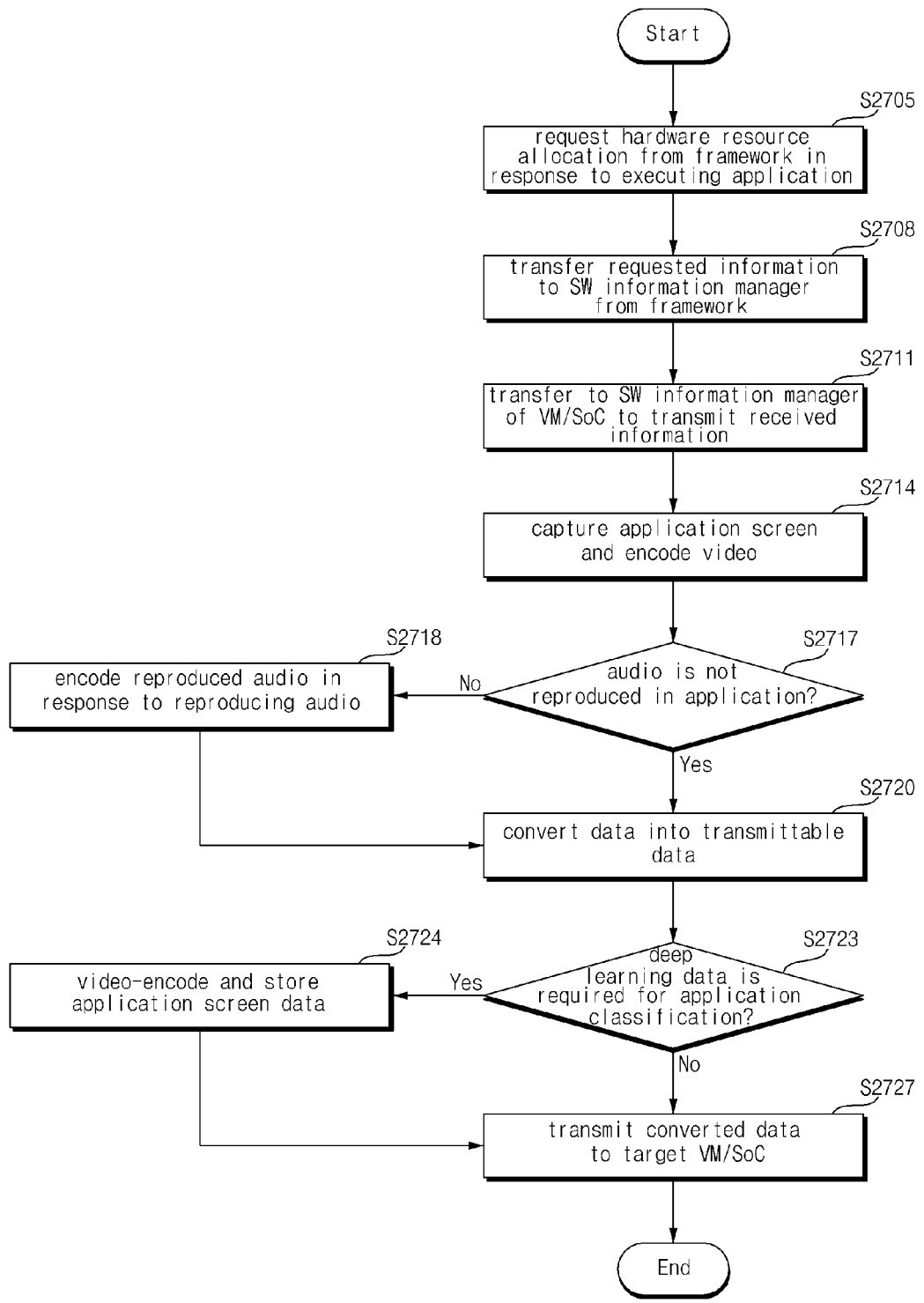
Figure 27B:
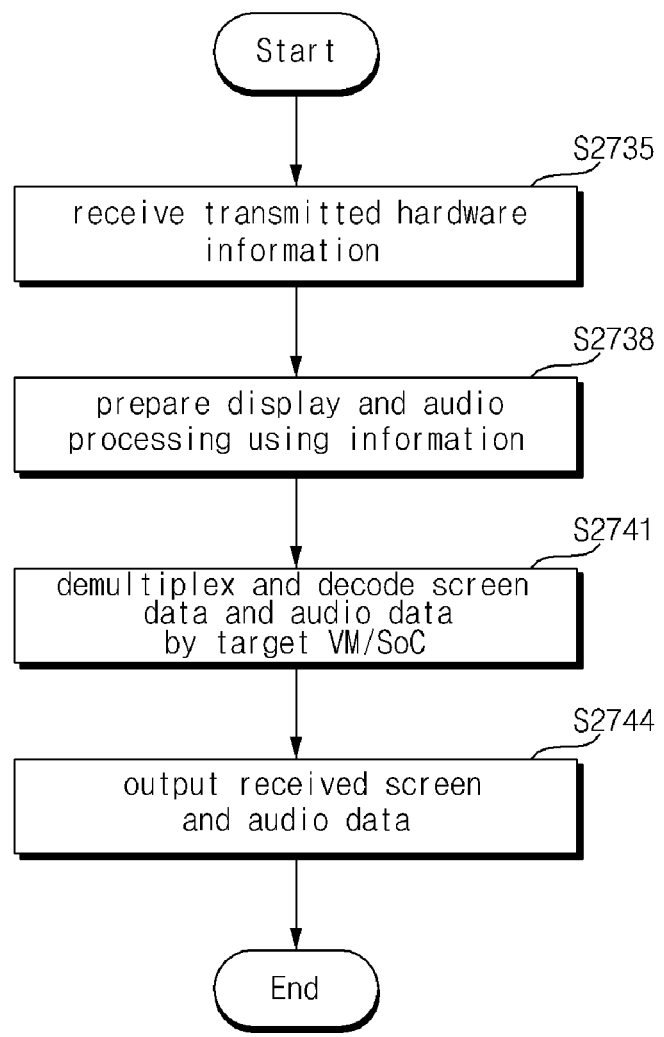

FIGS. 26 to 27B are views referred to in the description of a case of transmitting new application data.

First, referring to FIG. 26, a virtual machine VIM1e on the left may be driven in the signal processing device 170, and a virtual machine VIM2e on the right may be driven in the second signal processing device 170b.

Meanwhile, in the case of transmitting new application data in case in which a new application that was not previously installed is installed and executed, the signal processing device 170 may transcode and transmit encoded video data and encoded audio data of the new application. In particular, by transcoding and transmitting the audio data without decoding, transmission efficiency during data transmission between the plurality of signal processing devices 170 and 170b in the vehicle 200 may be increased.

Meanwhile, the second signal processing device 170b may transcode and decode the video data and audio data received from the signal processing device 170 corresponding to the new application, control the decoded audio data to be output, and control the decoded video data to be displayed. Accordingly, transmission efficiency during data transmission between the plurality of signal processing devices 170 and 170b in the vehicle 200 may be increased.

FIG. 27A is a flowchart illustrating an operating method of the signal processing device 170 related to FIG. 26.

Referring to the figure, the signal processing device 170 requests hardware support allocation from the frameworks DF, VF, and AF in case in which a new application UTA is executed (S2705).

Next, the frameworks DF, VF, and AF in the signal processing device 170 transfer the requested information to the information manager (SWM1) (S2708).

Next, the information manager SWM1 in the signal processing device 170 transfers hardware information (audio information, display information) to the information manager SWM2 in the second signal processing device 170b to receive data (S2711).

Next, the signal processing device 170 captures an application screen and performs video encoding (S2714).

Next, the signal processing device 170 determines whether audio is reproduced in the application, and when audio is reproduced, the signal processing device 170 encodes the audio data (S2718).

Meanwhile, when audio is not reproduced in the application, the signal processing device 170 converts video data into transmittable data (S2720).

For example, the data processing manager SWD1 in the signal processing device 170 may transcode the encoded video data.

Meanwhile, when audio is reproduced in the application, the data processing manager SWD1 in the signal processing device 170 may transcode each of the encoded video data and encoded audio data.

Meanwhile, the signal processing device 170 determines whether learning data for category classification of applications is required (S2723), and if not necessary, the interface IF1 in the signal processing device 170 transmits the converted content data to the interface IF2 of the second signal processing device 170b (S2727).

Meanwhile, in step 2723 (S2723), if learning data for category classification of applications is required, the signal processing device 170 may video-encode and store the application data (S2724).

In particular, in response to executing the new application, the signal processing device 170 may periodically collect data, events, and framework information and infer a category of the new application by using a learning model, such as deep learning.

Also, the signal processing device 170 may change the data transmission method according to the inferred category of the new application.

FIG. 27B is a flowchart illustrating an operating method of the second signal processing device 170b related to FIG. 26.

Referring to the figure, in response to step 2711 (S2711) of FIG. 27A, the information manager SWM2 in the second signal processing device 170b receives hardware information (S2735).

Next, the second signal processing device 170b prepares audio processing, audio processing, and display processing using the received hardware information (S2738).

Next, in response to step 2727 (S2727) of FIG. 27A, the interface IF2 in the second signal processing device 170b may receive video data and audio data, and the second signal processing device 170b may transcode and decode each of the video data and the audio data (S2741).

For example, the transcoder TRSb in the second signal processing device 170b transcodes the audio data, the audio decoder VDDb decodes the audio data, and the image decoder IERb decodes the graphic image data.

Next, the second signal processing device 170b may output the audio data through the audio output device and output the video data through the display 180bb (S2744).

Figure 28:
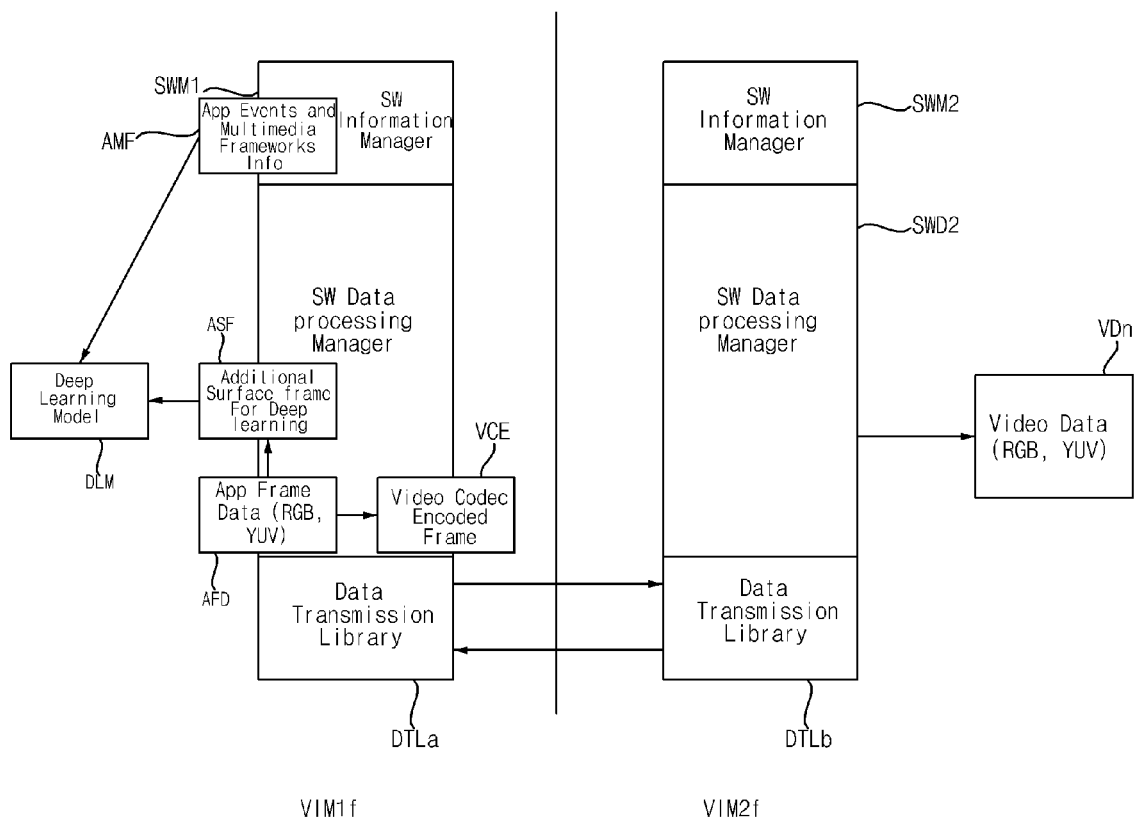
Figure 29:
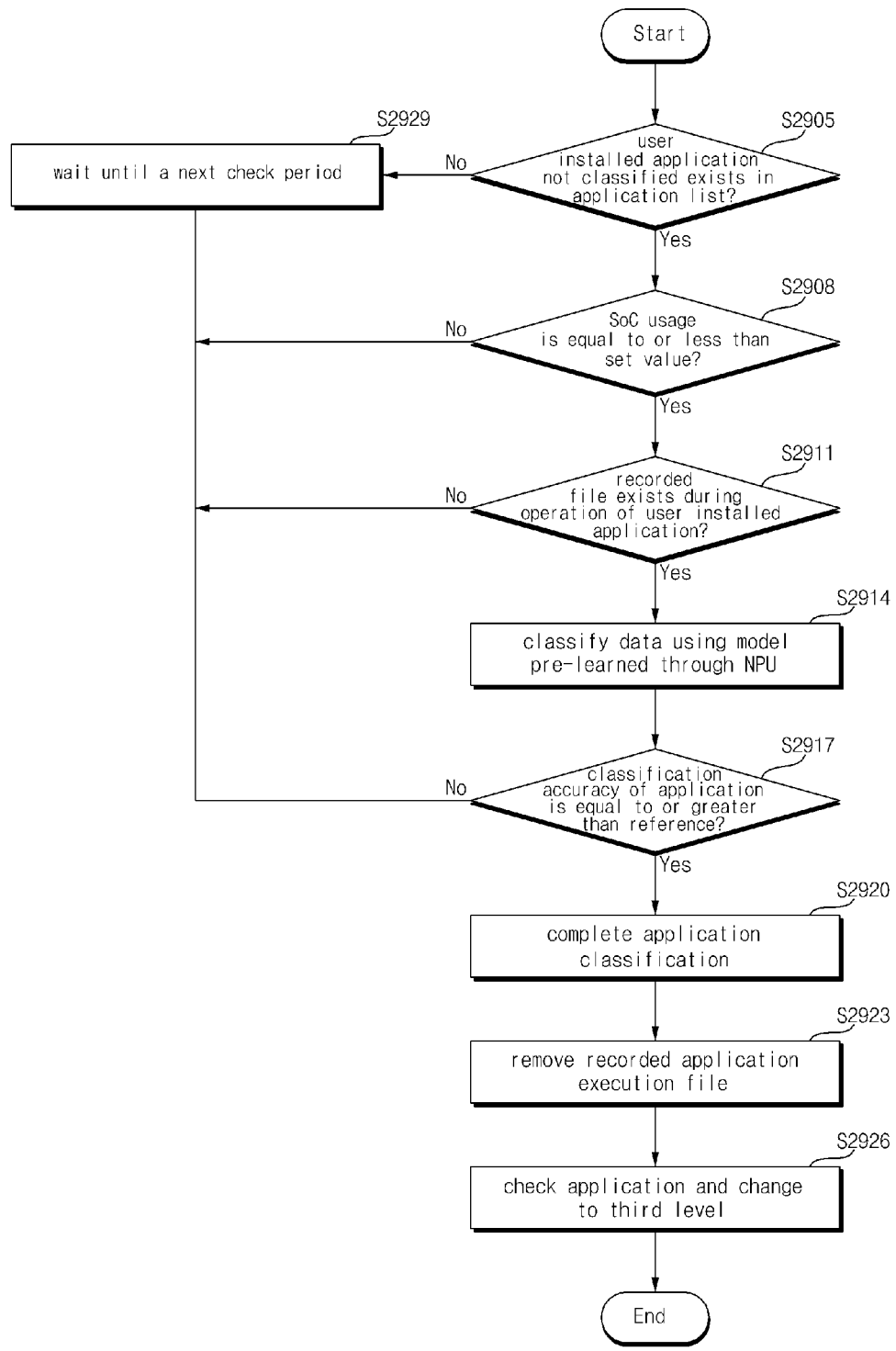

FIGS. 28 to 29 are views illustrating a learning-based application classification method.

First, referring to FIG. 28, a virtual machine VIM1f on the left may be driven in the signal processing device 170, and a virtual machine VIM2f on the right may be driven in the second signal processing device 170b.

Meanwhile, in case in which a new application that is not installed is installed and executed, the signal processing device 170 may periodically collect data, application event information, and multimedia framework information every 3 to 5 frames when the new application is executed, may infer a category of the new application using a learning model, and may change a data transmission method according to the inferred category.

Meanwhile, the information manager SWM1 in the signal processing device 170 may transmit the application event and multimedia framework usage information AMF to a learning model DLM, such as deep learning, for application classification based on learning.

Meanwhile, the data processing manager SWD1 in the signal processing device 170 may transmit information ASF related to an additional surface frame to the learning model DLM for learning, such as deep learning.

For example, the data processing manager SWD1 in the signal processing device 170 may encode a screen of a currently driven or currently focused application at a low frame rate, for example, 3 to 5 frames per second (fps).

The learning model DLM performs learning using the learning model by using the input application event, the multimedia framework usage information AMF, the information related to the additional surface frame ASF, and the like.

For example, the learning model DLM may perform learning based on a deep learning model capable of analyzing time series data, such as LSTM or GRU.

Meanwhile, when the system is in an idle state, the signal processing device 170 may classify applications using data encoded with a pre-learned model.

Meanwhile, for application classification, the signal processing device 170 may secure additional application data when the accuracy is less than a certain level, and change the classification level to the third level (level 2) when the accuracy is equal to or higher than the certain level.

The signal processing device 170 may classify applications through a cycle of changing screens of applications to be executed, and accordingly, as described above, the data transmission method may change based on the type of the classified application. Accordingly, transmission efficiency during data transmission between the plurality of signal processing devices 170 and 170b in the vehicle 200 may be increased.

FIG. 29 is a flowchart illustrating an operating method of the signal processing device 170 related to FIG. 28.

Referring to the figure, the signal processing device 170 determines whether a new application exists in the application list (S2905), and if a new application does not exist, the signal processing device 170 makes the process of the learning model to wait until a next check period (S2929).

Meanwhile, in step 2905 (S2905), in case in which a new application exists in the application list, the signal processing device 170 determines whether a processor usage rate is less than or equal to a set value (S2908), and if the processor usage rate is less than or equal to the set value, the signal processing device 170 determines whether a recorded file exists during the operation of the new application (S2911), and if there is a recorded file, the signal processing device 170 classifies the new application using a pre-learned model (S2914).

Meanwhile, when classifying the new application, the signal processing device 170 determines whether the accuracy is higher than a certain accuracy (S2917), secures additional application data when the accuracy is less than the certain level, and completes the application classification when the accuracy is equal to or higher than the certain level (S2920).

Next, the signal processing device 170 may remove the recorded file when the new application operates (S2923), and change the classification level to the third level (level 2)

(S2926). Accordingly, as described above, the data transmission method may change based on the type of classified application.

Meanwhile, the display apparatus 100 for a vehicle according to another embodiment of the present disclosure includes a first display 180a and a second display 180b located in a vehicle 200, and a signal processing device 170 including a processor 175 performing signal processing for the first display 180a and the second display 180b, and the processor 175 in the signal processing device 170 executes first to third virtual machines 520 to 540 on a hypervisor 505 in the processor 175, the second virtual machine 530 operates for the first display 180a, and the third virtual machine 540 operates for the second virtual machine 540. In response to transmitting data to the second virtual machine 530 or the third virtual machine 540, the first virtual machine 520 in the processor 175 varies a data transmission method based on the type of data.

Accordingly, transmission efficiency during data transmission between a plurality of virtual machines in the vehicle 200 may be increased. In addition, resources in the plurality of virtual machines for the plurality of displays in the vehicle 200 may be efficiently managed.

Meanwhile, the changing of data transmission method during data transmission between the signal processing device 170 and the second signal processing device 170b described above with reference to FIGS. 9 to 29 may be applied as it is in case in which data is transmitted between the plurality of virtual machines 520, 530, and 540 executed in the signal processing device 170.

For example, in response to transmitting application data including video data and graphic images, the first virtual machine 520 may transcode and transmit encoded video data, and encode and transmit a graphic image. In particular, by transmitting the encoded video data without separate decoding, transmission efficiency during data transmission between the plurality of signal processing devices 170 and 170b in the vehicle 200 may be increased.

As another example, in response to transmitting application data including camera data and a graphic image, the first virtual machine 520 may encode and transmit the graphic image, scale down and transmit the camera data in case in which the camera data has a resolution less than or equal to a reference resolution, and scale down, encode, and transmit the camera data in case in which the camera data has a resolution exceeding the reference resolution. In particular, by transmitting low-resolution camera data without separate encoding, transmission efficiency during data transmission between the plurality of signal processing devices 170 and 170b in the vehicle 200 may be increased.

As another example, in response to transmitting application data including audio data and a graphic image, the first virtual machine 520 may transcode and transmit encoded audio data, and encode and transmit the graphic image. In particular, by transmitting the encoded audio data without separate decoding, transmission efficiency during data transmission between the plurality of signal processing devices 170 and 170b in the vehicle 200 may be increased.

Meanwhile, although preferred embodiments of the present disclosure have been shown and described above, the present disclosure is not limited to the specific embodiments described above, and the technical field to which the present disclosure belongs without departing from the gist of the present disclosure claimed in the claims. Of course, various modifications are possible by those skilled in the art, and these modifications should not be individually understood from the technical spirit or perspective of the present disclosure.

What is claimed is:

1. A display apparatus for a vehicle, the display apparatus comprising:
   a first display and a second display sized to be located in a vehicle;
   a signal processing device including a processor configured to output each processed image signal to the first display and the second display;
   a third display sized to be located in the vehicle; and
   a second signal processing device including a second processor configured to output a processed image signal to a third display,
   wherein, in response to transmitting data from the signal processing device to the second signal processing device, the signal processing device is configured to change a data transmission method based on a type of data or a classified level of software or application,
   wherein the signal processing device is further configured to:
   in response to information on the software or the application not existing, designate the software or application to be transmitted as a first level,
   in response to the software or the application being primarily classified based on resources, designate the software or application to be transmitted as a second level.

2. The display apparatus of claim 1, wherein
   the processor in the signal processing device is configured to execute a plurality of virtual machines on a hypervisor in the processor.

3. The display apparatus of claim 1, wherein
   the processor in the signal processing device is configured to execute a plurality of virtual machines on a hypervisor in the processor, and
   change a data transmission method based on a type of the data, in response to transmitting data to between the plurality of virtual machines.

4. The display apparatus of claim 1, wherein the signal processing device is configured to classify categories into a plurality of levels based on the software or application-use resources, and change the data transmission method based on the classified levels.

5. The display apparatus of claim 1, wherein the signal processing device is configured to execute an information manager for managing an application list and information, a data processing manager for managing a data processing method in the application list, and an interface for outputting data to be transmitted.

6. The display apparatus of claim 5, wherein the signal processing device is configured to check the application list and information through the information manager and then change the data transmission method based on a classification level of an application in the application.

7. The display apparatus of claim 1, wherein the signal processing device is configured to, in response to transmitting application data including video data and a graphic image, transcode and transmit encoded video data, and encode and transmit the graphic image.

8. The display apparatus of claim 7, wherein the second signal processing device is configured to transcode and decode video data received from the signal processing device, decode the graphic image, synthesize the decoded video data and the decoded graphic image, and display a synthesized image.

9. The display apparatus of claim 1, wherein the signal processing device is configured to, in response to transmitting application data including camera data and a graphic image, encode and transmit the graphic image, scale down and transmit the application data in case in which the camera data is less than or equal to a reference resolution, and scale down, encode, and transmit the application data in case in which the camera data exceeds the reference resolution.

10. The display apparatus of claim 9, wherein the second signal processing device is configured to selectively decode camera data received from the signal processing device, synthesize the selectively decoded camera data and the graphic image, and display a synthesized image.

11. The display apparatus of claim 1, wherein the signal processing device is configured to, in response to transmitting application data including audio data and a graphic image, transcode and transmit encoded audio data, and encode and transmit the graphic image.

12. The display apparatus of claim 11, wherein the second signal processing device is configured to transcode and decode audio data received from the signal processing device, output the decoded audio data, decode the graphic image, and display the decoded graphic image.

13. The display apparatus of claim 1, wherein
the signal processing device is configured to, in response to transmitting application data including a graphic image, encode and transmit the graphic image, and
the second signal processing device is configured to decode the graphic image and display the decoded graphic image.

14. The display apparatus of claim 13, wherein the second signal processing device is configured to transmit event occurrence information to the signal processing device in case in which an event occurs in the displayed graphic image.

15. The display apparatus of claim 1, wherein the signal processing device is configured to, in case in which a new application that was not previously installed is installed and executed, transcode and transmit each of encoded video data and encoded audio data of the new application.

16. The display apparatus of claim 15, wherein the second signal processing device is configured to transcode and decode video data and audio data received from the signal processing device, output the decoded audio data, and display the decoded video data.

17. The display apparatus of claim 15, wherein the signal processing device is configured to, in response to executing the new application, periodically collect data, an event, and framework information, infer a category of the new application using a learning model, and change a data transmission method based on an inferred category.

18. A display apparatus for a vehicle, the display apparatus comprising:
a first display and a second display sized to be located in a vehicle; and
a signal processing device including a processor configured to output each processed image signal to the first display and the second display,
wherein the processor in the signal processing device is configured to execute a plurality of virtual machines on a hypervisor in the processor,
the processor is configured to, in response to transmitting data between the plurality of virtual machines, change a data transmission method based on a type of data or a classified level of software or application,
wherein the signal processing device is further configured to:
in response to information on the software or the application not existing, designate the software or application to be transmitted as a first level,
in response to the software or the application being primarily classified based on resources, designate the software or application to be transmitted as a second level.

19. The display apparatus of claim 18, wherein the signal processing device is configured to, in response to transmitting application data including video data and a graphic image, transcode and transmit encoded video data, and encode and transmit the graphic image.

20. The display apparatus of claim 18, wherein the signal processing device is configured to, in response to transmitting application data including camera data and a graphic image, encode and transmit the graphic image, scale down and transmit the application data in case in which the camera data is less than or equal to a reference resolution, and scale down, encode, and transmit the application data in case in which the camera data exceeds the reference resolution.

* * * * *